United States Patent
Talbot et al.

(10) Patent No.: US 11,422,271 B2
(45) Date of Patent: Aug. 23, 2022

(54) PROTECTION LEVEL GENERATION METHODS AND SYSTEMS FOR APPLICATIONS USING NAVIGATION SATELLITE SYSTEM (NSS) OBSERVATIONS

(71) Applicant: Trimble Inc., Sunnyvale, CA (US)

(72) Inventors: Nicholas Talbot, Victoria (AU); Xiaoming Chen, Höhenkirchen Siegertsbrunn (DE)

(73) Assignee: Trimble Inc., Sunnyvale, CA (US)

( * ) Notice: Subject to any disclaimer, the term of this patent is extended or adjusted under 35 U.S.C. 154(b) by 142 days.

(21) Appl. No.: 17/009,521

(22) Filed: Sep. 1, 2020

(65) Prior Publication Data
US 2021/0072407 A1    Mar. 11, 2021

(30) Foreign Application Priority Data
Sep. 10, 2019  (EP) .................................. 19196386

(51) Int. Cl.
*G01S 19/44* (2010.01)

(52) U.S. Cl.
CPC .................................. *G01S 19/44* (2013.01)

(58) Field of Classification Search
CPC ....................................................... G01S 19/44
(Continued)

(56) References Cited

U.S. PATENT DOCUMENTS 10,274,606 B1 * 4/2019 Phan ..................... G01S 19/41
11,143,765 B2 * 10/2021 Orejas ................... G01S 19/20
(Continued)

FOREIGN PATENT DOCUMENTS

CN    108680942 A  * 10/2018
EP    3 035 080 A1    6/2016
(Continued)

OTHER PUBLICATIONS

Extended European Search Report for Application No. 19196386.7-1206, dated Mar. 17, 2020, 9 pages.
(Continued)

*Primary Examiner* — Harry K Liu
(74) *Attorney, Agent, or Firm* — Kilpatrick Townsend & Stockton LLP

(57) ABSTRACT

Some embodiments of the invention relate to methods carried out by an NSS receiver and/or a processing entity capable of receiving data therefrom, for estimating parameters derived from NSS signals useful to determine a position, and for generating protection level(s) for an application relying on NSS observations to produce an estimate of said parameters. A float solution is computed using NSS signals observed by the NSS receiver. A best integer ambiguity combination that minimizes an error norm is identified based on the float solution. Additional integer ambiguity combinations are identified, which have the smallest error norms that, together with the error norm of the best integer ambiguity combination, jointly satisfy the integrity risk. A measure of spread of the best and additional integer ambiguity combinations is computed. The protection level(s) is then generated from the measure of spread. Systems and computer programs are also disclosed. Some embodiments may for example be used for safety-critical applications such as highly-automated driving and autonomous driving.

20 Claims, 19 Drawing Sheets

(58) Field of Classification Search
USPC .................................................. 342/357.27
See application file for complete search history.

(56) References Cited

U.S. PATENT DOCUMENTS

| | | | |
|---|---|---|---|
| 11,221,419 B1 * | 1/2022 | Phan | ................. G01S 19/44 |
| 2009/0027262 A1 | 1/2009 | Wu et al. | |
| 2011/0140959 A1 | 6/2011 | Vollath | |

FOREIGN PATENT DOCUMENTS

| | | | | |
|---|---|---|---|---|
| EP | 3 130 943 A1 | 2/2017 | | |
| EP | 3789968 A1 * | 3/2021 | ............. | G06F 21/64 |
| WO | 2009/014823 A2 | 1/2009 | | |
| WO | 2010/021656 A2 | 2/2010 | | |
| WO | 2010/021657 A2 | 2/2010 | | |
| WO | 2010/021658 A2 | 2/2010 | | |
| WO | 2010/021659 A2 | 2/2010 | | |
| WO | 2010/021660 A2 | 2/2010 | | |
| WO | 2010/096190 A2 | 8/2010 | | |

OTHER PUBLICATIONS

Wu, S. et al., "Geometry Extra-Redundant Almost Fixed Solutions: A High Integrity Approach for Carrier Phase Ambiguity Resolution for High Accuracy Relative Navigation," Position, Location and Navigation Symposium, 2008, Monterey, California, Sep. 3. IEEE/ION, pp. 568-582.
Khanafesh, S. et al. 2010, "A New Approach for Calculating Position Domain Integrity Risk for Cycle Resolution in Carrier Phase Navigation Systems", IEEE Transactions on Aerospace and Electronic Systems, vol. 46, No. 1, January, pp. 296-307.
Abdel-Hafez, M.F., et al. 2003. "A High-Integrity and Efficient GPS Integer Ambiguity Resolution Method", Navigation: Journal of the Institute of Navigation, vol. 50, No. 4, Winter 2003-2004, pp. 295-310.
Baarda, W. "A testing procedure for use in geodetic networks". Netherlands Geodetic Commission, Publication on Geodesy, New Series, vol. 2(5), 1968, Delft, 97 pages.
Betti, B, et al., "A geometric illustration of ambiguity resolution in GPS theory and a Bayesian approach", Manuscripta Geodaetica, vol. 18, 1993, pp. 317-330.
Blanch, J. et al. "A Proposal for Multi-Constellation Advanced RAIM for Vertical Guidance". In Proceedings of the 24$^{th}$ International Technical Meeting of the Satellite Division of the Institute of Navigation, Portland, OR, Sep. 19-23, 2011, pp. 2665-2680.
Blewitt, G, "Carrier-phase ambiguity resolution for the Global Positioning System applied to geodetic baselines up to 2000km". Journal of Geophysical Research, vol. 94 No. B8, pp. 10.187-10. 302, Aug. 10, 1989.
Brown, R.G. et al., "A Kalman Filter Approach to Precision GPS Geodesy", Navigation: Journal of the Institute of Navigation, vol. 30, No. 4., 1983-1984, pp. 338-349.
Brown, R.G., "A Baseline GPS RAIM Scheme and a Note on the Equivalence of Three RAIM Methods", Navigation: Journal of the Institute of Navigation, vol. 39. No. 3, Fall 1992, pp. 301-316.
Euler, H.J., 1990. "On a Measure of the Discernibility Between Different Ambiguity Solutions in the Static-Kinematic GPS-Mode" Proc. IAG Symposium No. 107, Kinematic Systems in Geodesy, Surveying and Remote Sensing, K.P. Schwarz and G. Lachapelle (Eds.), Banff, Canada, pp. 285-295.

Khanafesh, S. et al. 2012, "Integrity risk of cycle resolution in the presence of bounded faults", Proceedings of the 2012 IEEE / ION Position Location and Navigation Symposium, Apr. 23, Monterey, CA, 9 pages.
Talbot, N.C., "Centimeters in the Field, a User's Perspective of Real-Time Kinematic Positioning in a Production Environment", Proceedings of the 6$^{th}$ International Technical Meeting of the Satellite Division of the Institute of Navigation, ION-GPS-93, Salt Lake City, Utah, Sep. 22-24, pp. 1049-1057.
Teunissen, P.J.G. 1990. "Quality Control in Integrated Navigation Systems", IEEE Aerospace and Electronic Systems Magazine, Aug. 1990, 8 pages.
Teunissen, P.J.G., "Least-Squares Estimation of the Integer GPS Ambiguities", Delft Geodetic Computing Center (LGR) 16p. Invited Lecture, Section IV Theory and Methodology. IAG General Meeting, Beijing, China, Aug. 1993, 17 pages.
Teunissen, P.J.G., "Ambiguity Dilution of Precision: Definition, Properties and Application", Proceeding of the 10$^{th}$ International Technical Meeting of the Satellite Division of the Institute of Navigation (ION-GPS-97), Sep. 16-19, Kansas City, MO, 1997, pp. 891-899.
Teunissen, P.J.G., "Success probability of integer GPS ambiguity rounding and bootstrapping", Journal of Geodesy, Jan. 1998, 72: 606-612.
Teunissen, P.J.G., "Bias Robustness of GPS Ambiguity Resolution", ION-GPS-2000, Sep. 2000, Salt Lake City, UT, pp. 104-112.
Teunissen, P.J.G., "A New Class of GNSS Ambiguity Estimators", Artificial Satellites, vol. 37, No. 4., Jan. 2002, 10 pages.
Teunissen, P.J.G. 2003. "Towards a unified theory of GNSS ambiguity resolution", Journal of Global Positioning Systems, (2003), vol. 2, No. 1, pp. 1-12.
Teunissen, P.J.G., "An Invariant Upperbound for the GNSS Bootstrapped Ambiguity Success Rate", Journal of Global Positioning Systems, vol. 2, No. 1, Jun. 2003, pp. 13-17.
Teunissen, P.J.G., "GNSS Integer Ambiguity Validation: Overview of Theory and Methods", Proceedings of the Institute of Navigation Pacific PNT 2013, Honolulu, Hawaii, Apr. 23-25, 2013, pp. 673-684.
Teunissen, P.J.G et al., "A recursive slippage test for use in state-space filtering", Manuscripta Geodaetica, 1989, 14:383-390.
Vollath, U., "The Factorized Multi-Carrier Ambiguity Resolution (FAMCAR) Approach for Efficient Carrier-Phase Ambiguity Estimation", Proceedings of the 17$^{th}$ International Technical Meeting of the Satellite Division, Long Beach, CA, Sep. 21-14, 2004, pp. 2499-2508.
Walter, T. et al., "Integrity Lessons from the WAAS Integrity Performance Panel (WIPP)", Proceedings of the National Technical Meeting of the Institute of Navigation, Anaheim, CA, Jan. 2003, pp. 183-194.
Zhu, N., et al. 2018. "GNSS Position Integrity in Urban Environments: A Review of Literature", IEEE Transactions on Intelligent Transportation Systems, vol. 19, No. 9, 19 pages.
Teunissen, P.J.G., "A New Method for Fast Carrier Phase Ambiguity Estimation", Proceedings of 1994 IEEE Position, Location and Navigation Symposium—PLANS'94, May 1994, pp. 562-573.
Shuwu, W. et al., "Geometry Extra-Redundant Almost Fixed Solutions: A High Integrity Approach for Carrier Phase Ambiguity Resolution for High Accuracy Relative Navigation," Position, Location and Navigation Symposium, 2008 IEEE/ION, IEEE, May 5, 2008, pp. 568-582.

* cited by examiner

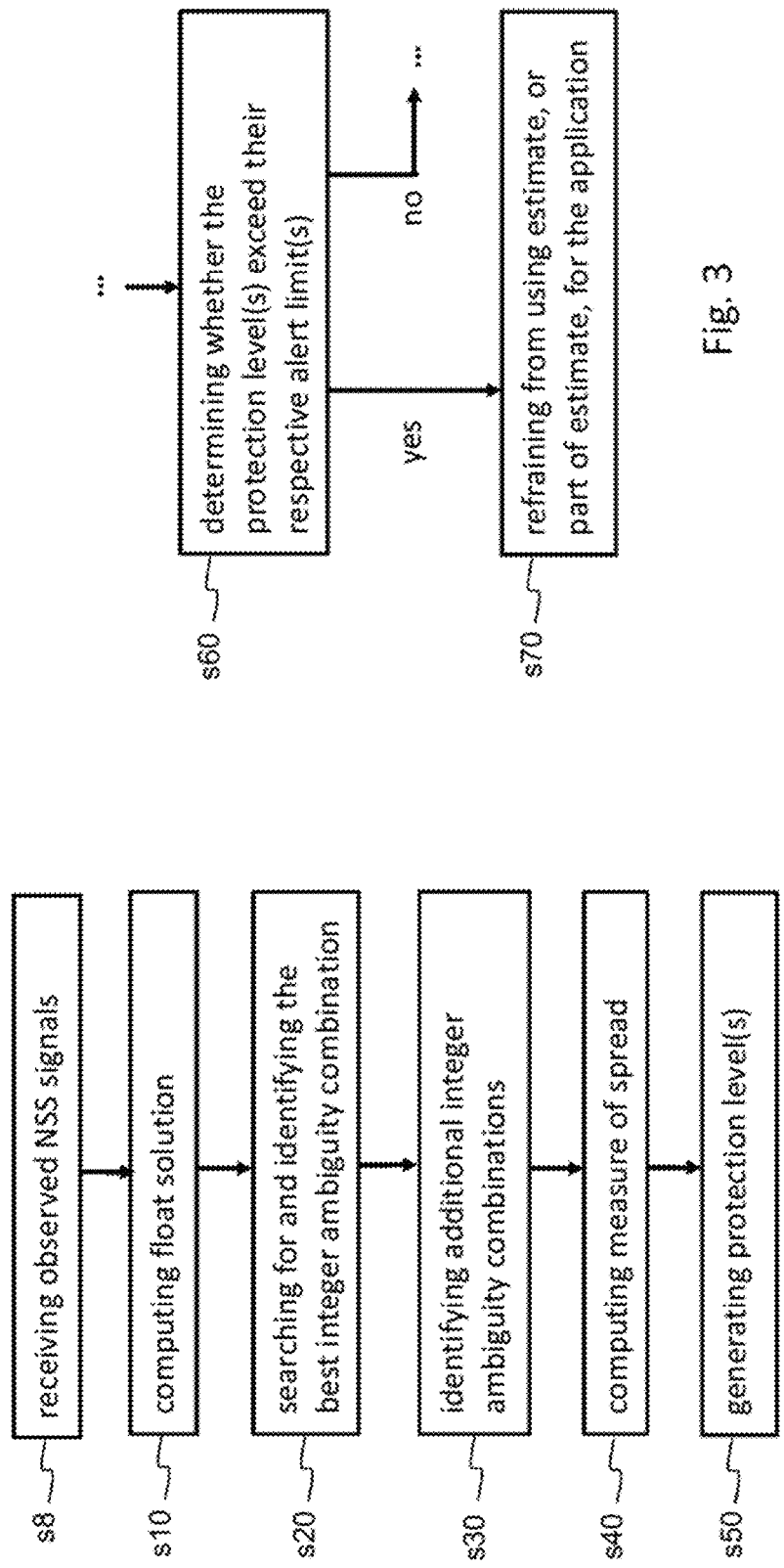

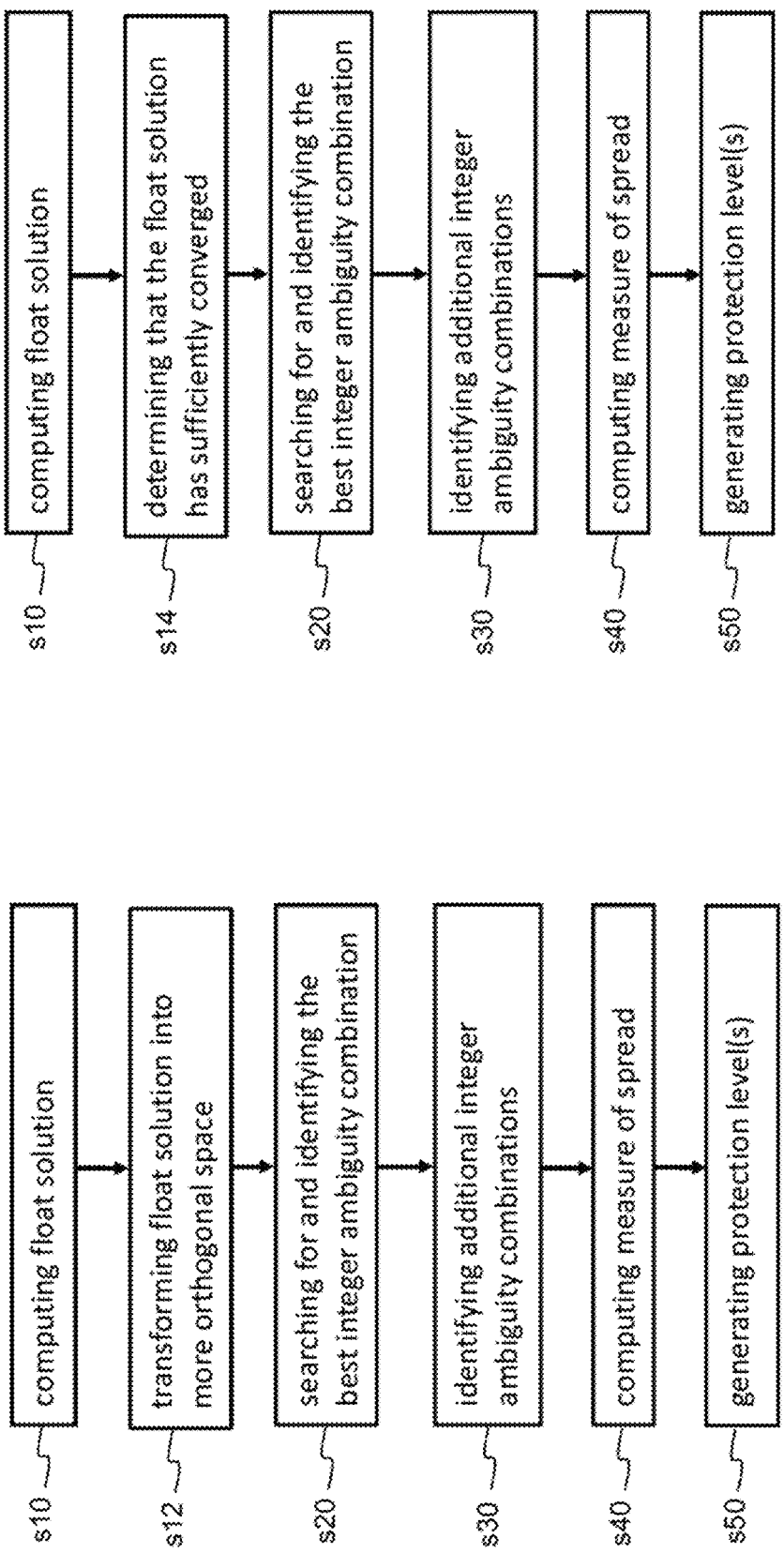

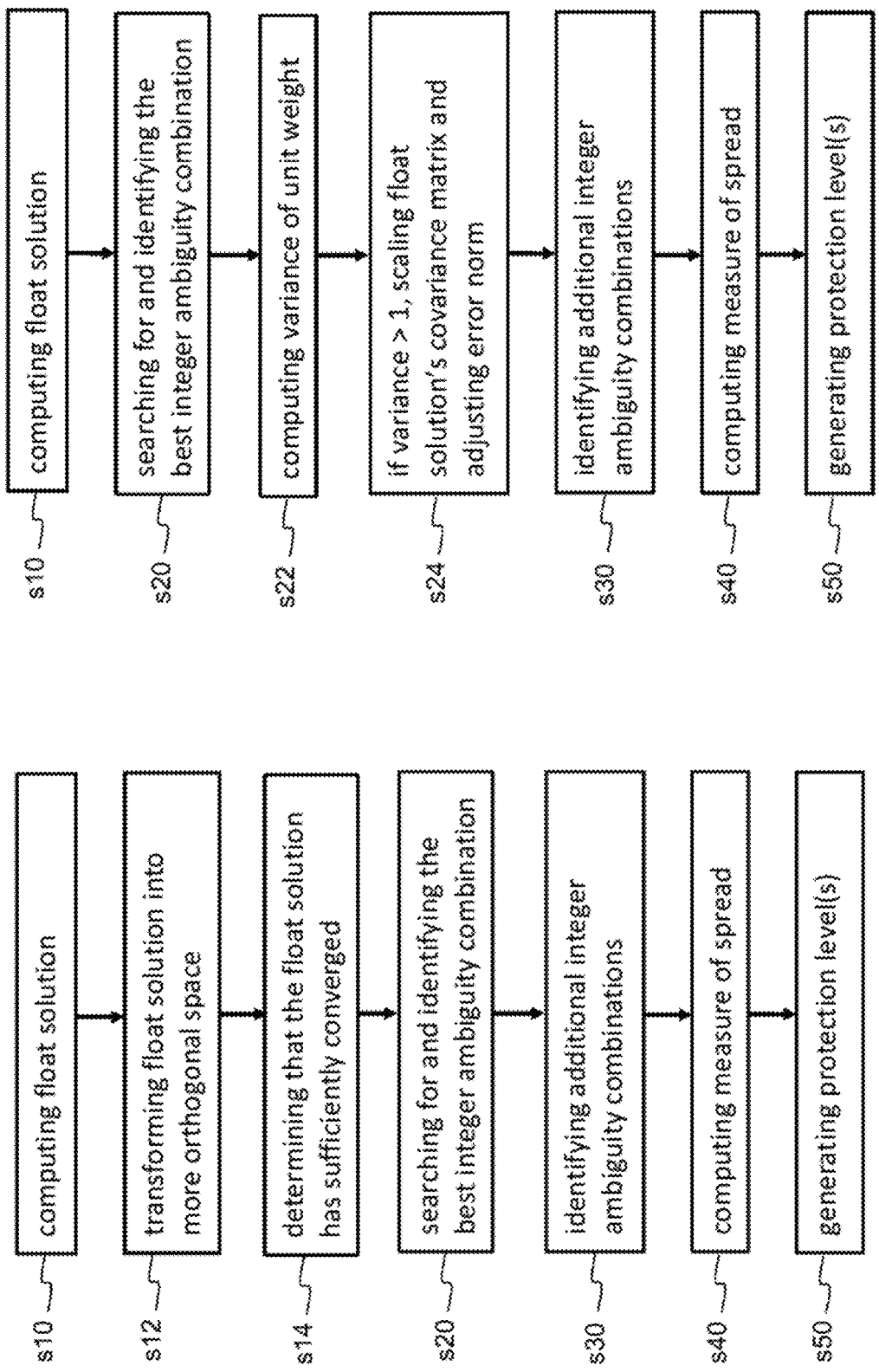

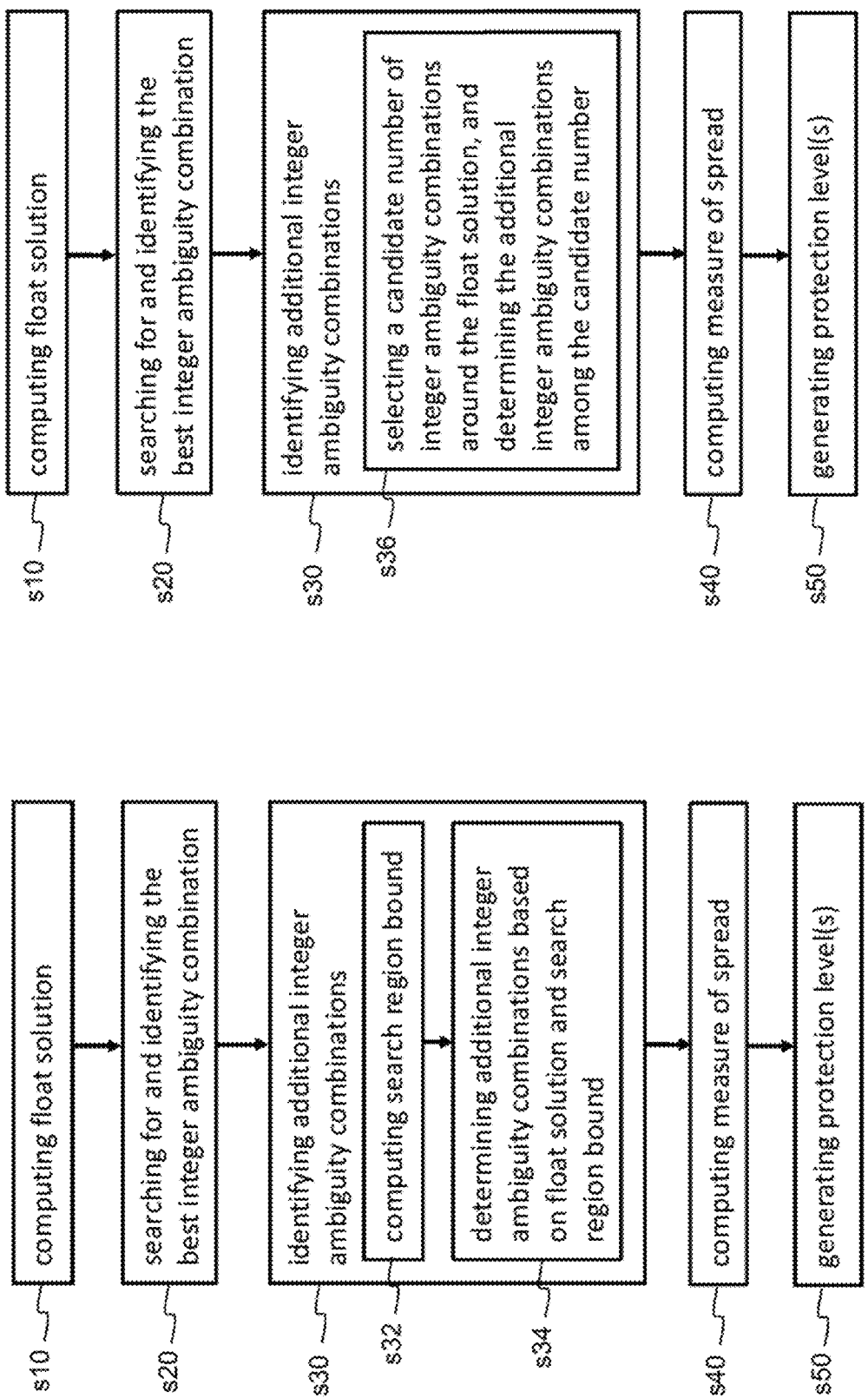

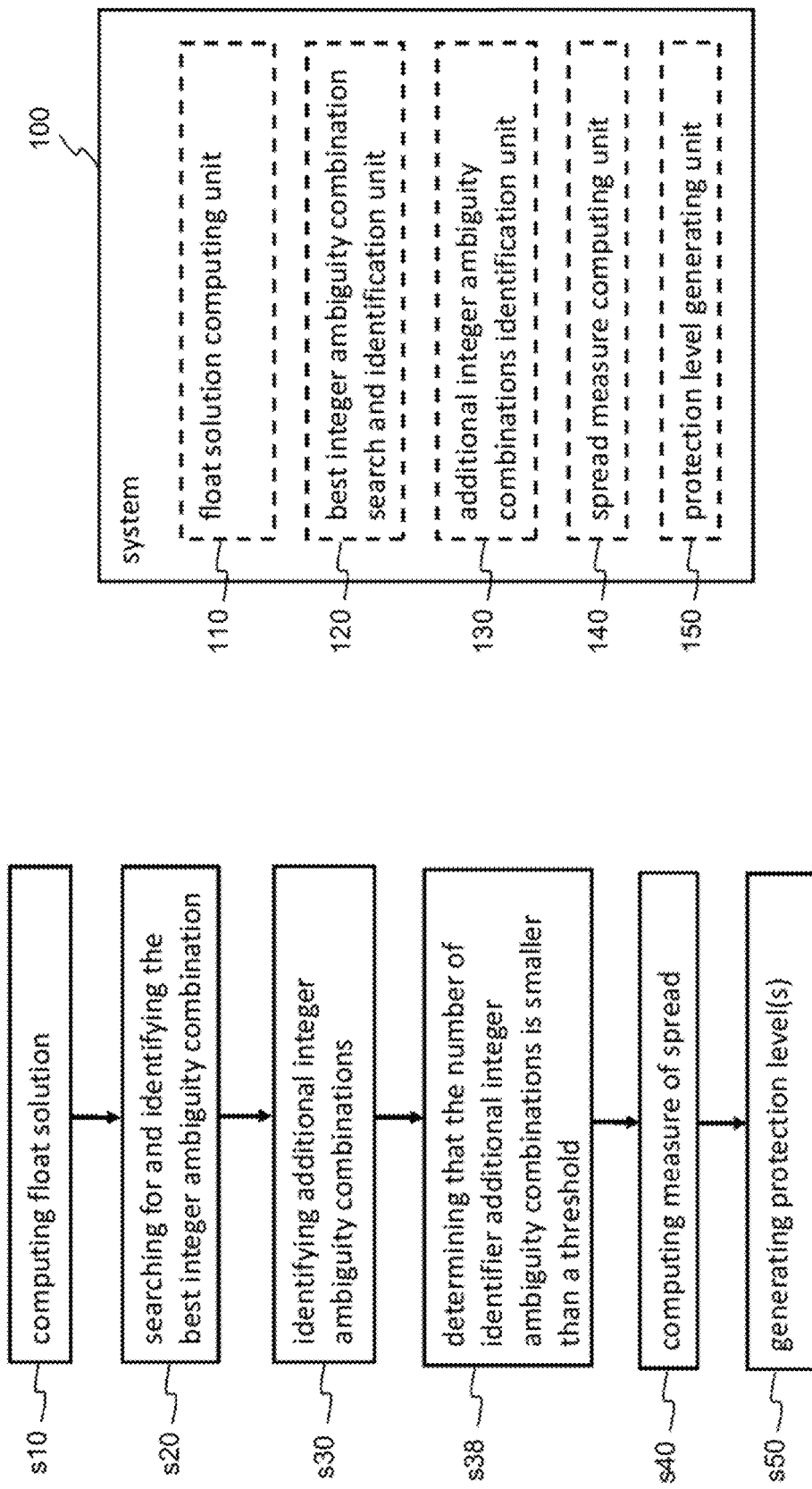

PROTECTION LEVEL GENERATION METHODS AND SYSTEMS FOR APPLICATIONS USING NAVIGATION SATELLITE SYSTEM (NSS) OBSERVATIONS

CROSS-REFERENCE TO RELATED APPLICATIONS

The present application claims priority to European Patent Application No. EP19196386.7, filed Sep. 10, 2019, the contents of which are incorporated herein by reference in their entirety for all purposes.

FIELD OF TECHNOLOGY

The invention relates to methods, systems, and computer programs for estimating, or for processing a prior estimation of, parameters derived from navigation satellite system (NSS) signals useful to determine a position, and for generating at least one protection level for an application relying on NSS observations to produce an estimate of said parameters or a combination thereof. The fields of application of the methods, systems, and computer programs include, but are not limited to, navigation, highly-automated driving, autonomous driving, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS, also referred to as NAVIC) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person will recognize that the same or similar principles apply to RNSS systems.

The main GNSS observables are therefore the carrier phase and code (pseudorange), the former being generally much more precise than the latter, but ambiguous. These observables enable a user to obtain the geometric distance from the receiver to the satellite. With known satellite position and satellite clock error, the receiver position can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequencies is modulated with a pseudo-random number (PRN) code, and with satellite navigation data. Two different PRN codes are transmitted by each satellite: a C/A code and a P code which is encrypted for DoD-authorized users. Each C/A code is a unique sequence of 1023 bits, which is repeated each millisecond. Other NSS systems also have satellites transmitting multiple signals on multiple carrier frequencies.

For some applications relying on the above-discussed techniques, the provision of integrity information may be desirable to indicate a level of trust that can be placed in the correctness of values of parameters estimated using these techniques. Integrity information may assist applications in deciding whether estimated parameters can be trusted and are thus safe to use, or, on the contrary, they cannot be trusted and may be unsafe to use.

Reference [2] relates to a technique for high-accuracy and high-integrity GPS relative navigation applications. The approach relaxes the integrity requirements for obtaining a correct fixed solution by introducing so-called almost fixed solutions (candidate sets of integer ambiguities), "where only a few (typically just one) of the integer ambiguities are fixed incorrectly at a time by a small amount (±1 cycle, etc.)" (p. 571, right-hand col., last paragraph). These almost fixed solutions form a so-called Enlarged Pull-In Region (EPIR), i.e. a region centered around the fixed solution. The probability of the almost-fixed solutions plus that of the correct fixed solution together have to meet the stringent integrity requirements. The precision of the almost fixed solution precision sits in-between the precision of the correctly-fixed solution and that of the float solution.

Reference [3] relates to a method for calculating the integrity risk for carrier phase navigation algorithms. Specifically, the impact of incorrect fixes (incorrect integer ambiguity candidates) in the position domain is evaluated and tight upper bounds on the resulting navigation integrity risk are defined. A mechanism to implement this method with a partially fixed solution in a navigation system is also described. Namely, a set of integer ambiguity combinations is identified by a bootstrap rounding method to sequentially fix ambiguities. Reference [13] discloses a similar technique.

There is a constant need for improving the implementation of positioning or similar systems making use of NSS measurements, and, in particular, for being able to reliably meet the integrity requirements of these systems, especially, but not only, in the context of safety-critical applications such as highly-automated driving and autonomous driving.

SUMMARY

The present invention aims at addressing the above-mentioned need. The invention includes methods, systems, computer programs, computer program products and storage mediums as defined in the independent claims. Particular embodiments are defined in the dependent claims.

In one embodiment, a method is carried out by at least one of a NSS receiver, and a processing entity capable of receiving data from the NSS receiver, for estimating, or processing a prior estimation of, parameters derived from NSS signals useful to determine a position, and for generating one or more protection levels for an application relying on NSS observations to produce an estimate of said parameters or a combination thereof. A protection level is a statistical error bound ensuring that the estimate only exceeds the protection level with a probability, hereinafter referred to as the "integrity risk". The method comprises the following: A float solution is computed using NSS signals observed by the NSS receiver. An integer ambiguity combination that minimizes an error norm is searched for, based on the float solution, and identified. The identified integer ambiguity combination is hereinafter referred to as "best integer ambiguity combination". Among a set of other integer ambiguity combinations determined based on the float solution, those integer ambiguity combinations, hereinafter referred to as "additional integer ambiguity combinations", having the smallest error norms that, together with the error norm of the best integer ambiguity combination, jointly satisfy the integrity risk are identified. A measure of spread is computed, the measure of spread being a measure of spread of at least one of: (i) the best integer ambiguity combination and the additional integer ambiguity combinations, and (ii) values of a parameter or of parameters derivable from the best integer ambiguity combination and the additional ambiguity combinations. The protection level(s) is then generated based on the computed measure of spread.

The method enables the generation of protection level(s) in a relatively robust way in that the method is generally more resistant to biases in the underlying float solution than prior art methods. In other words, the method is not contingent on, or at least less contingent on, the best integer ambiguity combination being correct. Biases in the underlying float solution may for example be associated with carrier phase ambiguity estimates being corrupted by unmodeled physical errors such as ionospheric bias and multipath.

The invention also relates, in one embodiment, to a system comprising at least one of: a NSS receiver, and a processing entity capable of receiving data from the NSS receiver, the system being for estimating, or processing a prior estimation of, parameters derived from NSS signals useful to determine a position, and for generating at least one protection level for an application relying on NSS observations to produce an estimate of said parameters or a combination thereof. The system is configured for carrying out the above-described method.

The invention also relates, in some embodiments, to computer programs, computer program products, and storage mediums for storing such computer programs, comprising computer-executable instructions for carrying out, when executed on a computer such as one embedded in a NSS receiver or in another apparatus, or when executed on a set of computers such as a set of computers embedded in a set of apparatuses, the above-described method.

BRIEF DESCRIPTION OF THE DRAWINGS

Embodiments of the present invention shall now be described, in conjunction with the appended drawings in which:

FIG. 2b is a flowchart of a method in one embodiment of the invention, further comprising a step of receiving observed NSS signals;

FIG. 3 is a flowchart of a method in one embodiment of the invention, further comprising a step of using the protection level(s);

FIG. 4 is a flowchart of a method in one embodiment of the invention, further comprising a step of transforming the float solution into a more orthogonal space;

FIG. 5a is a flowchart of a method in one embodiment of the invention, further comprising a step of determining that the float solution's ambiguities have sufficiently converged;

FIG. 5b is a flowchart of a method in one embodiment of the invention, further comprising steps of transforming the float solution into a more orthogonal space and determining that the float solution's ambiguities have sufficiently converged;

FIG. 6 is a flowchart of a method in one embodiment of the invention, further comprising a step of computing a variance of unit weight;

FIG. 7 is a flowchart of a method in one embodiment of the invention, wherein identifying the additional integer ambiguity combinations comprises computing a search region bound;

FIG. 8 is a flowchart of a method in one embodiment of the invention, wherein identifying the additional integer ambiguity combinations comprises selecting a candidate number of integer ambiguity combinations around the float solution;

FIG. 9 is a flowchart of a method in one embodiment of the invention, further comprising determining that the number of identified additional integer ambiguity combinations is smaller than a threshold;

FIG. 10 schematically illustrates a system in one embodiment of the invention;

DETAILED DESCRIPTION

The present invention shall now be described in conjunction with specific embodiments. These serve to provide the skilled person with a better understanding but are not intended to in any way restrict the scope of the invention, which is defined by appended claims. In particular, the embodiments described throughout the description can be combined to form further embodiments to the extent that they are not mutually exclusive.

Throughout the following description, the abbreviation "GNSS" is used. The invention is, however, not limited to global navigation satellite systems (GNSS) but also applies to regional navigation satellite systems (RNSS). Thus, it is to be understood that each occurrence of "GNSS" in the following can be replaced by "RNSS" to form additional embodiments.

When the term "real-time" is used in the present document, it means that there is an action (e.g., data is processed, results are computed) as soon as the required information for that action is available. Thus, certain latency exists, which depends on various aspects depending on the involved component(s) of the system.

When the term "troposphere" is used in the present document, in particular, but not only, when discussing the effects the troposphere has on a NSS signal in terms of the delay affecting the NSS signal, this is meant to also include any effect of the other constituents of the non-ionized atmosphere, i.e. of the neutral atmosphere, such as effects of the stratosphere. For conciseness, and because the effects of the troposphere are dominant, it is therefore referred to the effects of the troposphere to mean both the effects of the troposphere and the stratosphere.

When the verb "broadcast" (and "broadcasting", etc.) is used, this also covers embodiments where the transmission is a form of multicasting.

Figure 1:
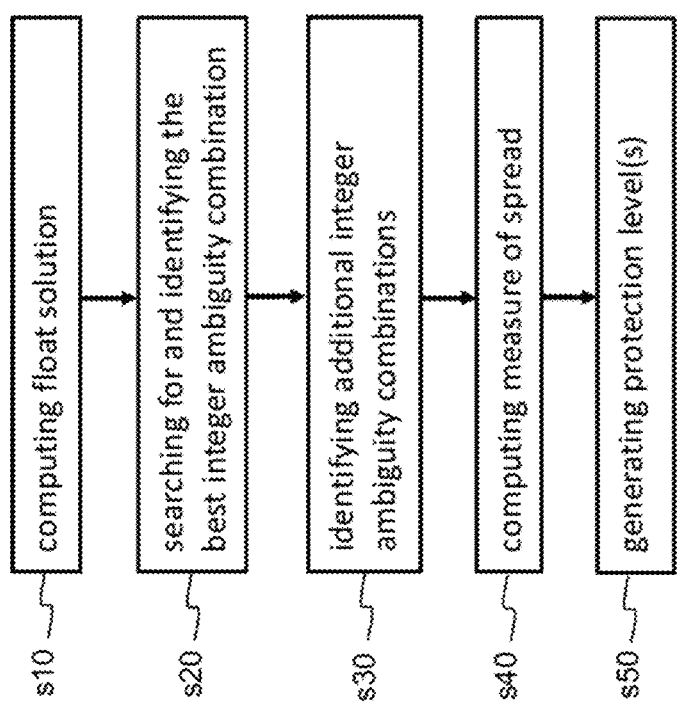
FIG. 1 is a flowchart of a method in one embodiment of the invention.

FIG. 1 is a flowchart of a method in one embodiment of the invention. The method may be carried out by a NSS receiver configured for observing NSS signals from a plurality of NSS satellites, by another processing entity capable of receiving data from the NSS receiver, or by an NSS receiver in conjunction with such other processing entity. The processing entity may be remotely located from the NSS receiver and may receive data representing the NSS observations from the NSS receiver.

In one embodiment, the method aims at estimating parameters derived from NSS signals useful to determine a position, such as the position of a rover receiver or reference station, and at generating one or more protection levels for an application that relies on NSS observations to produce an estimate of said parameters or a combination thereof. The method may eventually lead to estimating a rover position or reference station position, in addition to determining protection level(s) associated with said position.

In another embodiment, the method aims at processing a prior estimation of parameters derived from NSS signals useful to determine a position and at generating one or more protection levels for an application that relies on NSS observations to produce an estimate of said parameters or a combination thereof. In such an embodiment, the method may be a form of data post-processing method for post-processing the parameters estimated beforehand.

The estimated parameters may for example indicate the most probable number of carrier cycles along the distance separating an NSS satellite from the NSS receiver, i.e. the estimated parameters may be the resolved integer ambiguity. This also means that the method may estimate the position itself but not necessarily: parameters may be estimated that may be used, for example by another entity (such as a processing entity on a server dedicated to such task), to estimate or determine the position of the NSS receiver (i.e., the rover position) or of a reference station. Furthermore, other parameters such as, for example, properties of the ionosphere may be estimated. Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Doing so is useful for example for generating a correction stream to be broadcasted to users (see e.g. references [33] and [34]) together with associated protection level(s) (to provide a form of measure of quality of the correction information) and/or together with alert(s) generated based on the protection level(s) to alert users if the broadcasted corrections are "out-of-specification". The protection levels need not necessarily be broadcasted together with the correction data, however. The protection levels may instead be computed and then supplied in a separate stream, i.e. separate from the correction data stream, to users to provide them with an independent measure of the GNSS correction data quality. In another embodiment, protection levels may be computed and monitored, alerts may be generated if necessary, and then the alerts are broadcasted to the users (as part of the correction data stream and/or in a separate stream) without broadcasting the protection levels.

Yet furthermore, beyond determining the position of a rover or a reference station, if the position of NSS receivers (such as reference stations) is known, solving the integer ambiguities in the carrier phases by solving observation equations may also be used to eventually estimate the position of a satellite.

The application relying on NSS observations to produce an estimate of said parameters, or a combination thereof, may for example be a highly-automated driving or autonomous driving application relying on NSS observations to produce an estimate of the position, velocity, or acceleration of a vehicle. The method may for example provide a protection level or a plurality of protection levels enabling the application to determine whether the position solution computed based on the NSS observations can be trusted, i.e. meets the integrity requirement(s) of the application.

A protection level is a statistical error bound ensuring that the estimate only exceeds the protection level with a probability, here referred to as the "integrity risk". The integrity risk is a number set according to the integrity requirement(s) of the application. The protection level may be regarded as the uncertainty of the estimate. In one embodiment, the integrity risk is a number set with respect to a time interval to which the integrity risk applies. That is, in this embodiment, the protection level is a statistical error bound ensuring that the estimate only exceeds, within said time interval, the protection level with a probability being the integrity risk. The integrity risk may for example be set per second, per minute, or per hour. Other time intervals with respect to which the integrity risk is set may be used, however. For the sake of convenience, the integrity risk discussed in the following is considered to be set per NSS receiver epoch, i.e. per GNSS data epoch, which may for example be one second.

In one embodiment, the integrity risk is a number equal to or smaller than $10^{-3}$. In another embodiment, the integrity risk is a number comprised in a range between $10^{-5}$ and $10^{-9}$. In yet another embodiment, the integrity risk is a number comprised in a range between $10^{-7}$ and $10^{-9}$. In other embodiments, the integrity risk may be even smaller, especially for safety-of-life applications.

In step s10, a float solution is computed using NSS signals observed by the NSS receiver. The float solution comprises the float solution per se and its associated covariance matrix. Exemplary ways to compute a float solution are described below in section H.3.1, and further in relation to step 1 described with reference to FIG. 20. In one embodiment, computing the float solution using NSS signals involves a filter. Here, a filter is or comprises an algorithm or process, or a piece of software and/or hardware configured for implementing such an algorithm or process, in which a set of state variables (or "state vector") are maintained over time, i.e. the values of the state variables are estimated based on a series of measurements made over time. The series of measurements may comprise the observed NSS signals. Computing step s10 may involve, for example, a Kalman filter, a least squares estimator, and/or a robust estimator. The invention is, however, not limited to the use of Kalman filter(s), least squares estimator(s), and/or robust estimator(s). Other estimation techniques may be used. The term "estimator" is sometimes used as synonymous of filter in that context. Optionally, the float solution may be validated, for example as explained in section H.3.2 below.

In step s20, an integer ambiguity combination that minimizes an error norm is searched for, based on the float solution, and identified. Said identified integer ambiguity combination is here referred to as "best integer ambiguity combination". In one embodiment, the error norm of an integer ambiguity combination represents a distance from the integer ambiguity combination to the float solution. Exemplary ways to search for and identify an integer ambiguity combination to be considered as the best integer ambiguity combination are described below in section H.3.3, in section H.4.2 (notably describing finding of the integer ambiguity combination with the smallest error norm), and further in relation to step 4 described with reference to FIG. 20. In one embodiment, the integer ambiguity combination to be considered as the best integer ambiguity combination is derived from the float solution by mapping (or projecting) the float solution to a n-dimension integer space Zn, the mapping being performed using a mapping function or technique (see for example equation (8) below) that explicitly or implicitly minimizes an error norm. The mapping may involve, for example, an integer least squares (ILS) technique, an integer bootstrapping technique, and/or and integer rounding technique. The invention is, however, not limited to the use of integer least squares, integer bootstrapping, and/or integer rounding. Other mapping techniques may be used to search for and identify an integer ambiguity combination to be considered as the best integer ambiguity combination.

Optionally, the integer solution, i.e. the identified best integer ambiguity combination, may be validated, as explained in section H.3.4 below.

In step s30, additional integer ambiguity combinations are identified. These additional integer ambiguity combinations are those, among a set of other integer ambiguity combinations determined based on the float solution, that have the smallest error norms that, together with the error norm of the best integer ambiguity combination, jointly satisfy the integrity risk. In one embodiment, this step comprises performing an integer ambiguity search, forming a list (or any other suitable data structure, such as a tree) of candidate integer ambiguity combinations with their error norm, and selecting those with the smallest error norms that, together with the error norm of the best integer ambiguity combination, jointly satisfy the integrity risk. Exemplary ways to do so are described below in section H.4.2, and further in relation to steps 6 and 7 described with reference to FIG. 20.

In one embodiment, in step s30, a set of other integer ambiguity combinations is determined based on the float solution by taking all integer ambiguity combinations meeting a search region bound, as will be described below with reference to FIG. 7.

In another embodiment, a set of other integer ambiguity combinations is determined based on the float solution by taking a relatively large or a very large number of integer ambiguity combinations around the float solution, and, among those, the integer ambiguity combinations that have the smallest error norms that, together with the error norm of the best integer ambiguity combination, jointly satisfy the integrity risk, are taken as additional integer ambiguity combinations, as will be described below with reference to FIG. 8.

In step s40, a measure of spread is then computed, i.e. a measure of spread of the best and additional integer ambiguity combinations and/or a measure of spread of values of a parameter or of parameters derivable from the best and additional ambiguity combinations. In step s50, the protection level(s) is then generated based on the computed measure of spread. The larger the computed measure of spread of a parameter, the larger the generated protection level (i.e. the uncertainty of the parameter). The spread of the integer ambiguity combination candidates may be used to produce a protection level for any of the estimated parameters, or combinations thereof. For example, a protection level of the ionospheric bias associated with a given satellite may be estimated. Protection levels for position state parameters are directly relevant for navigation purposes, but, for the same or other purposes, the position parameters may be constrained and other parameters may be the focus.

In one embodiment, a single protection level is generated. For example, for some applications, computing a single three-dimensional protection level representing a spherical region may suffice. For some applications involving for example earthing moving machines, the vertical component may be important so that a single vertical protection level may suffice. In other embodiments, a plurality of protection levels is generated.

In one embodiment, for a position-related parameter, the measure of spread is or comprises the maximum separation in a specific coordinate frame between all of the positions corresponding to the best and additional integer ambiguity combinations. In one embodiment, for a non-position-related parameter, the measure of spread is or comprises the maximum separation in the parameter space between all of the parameter values corresponding to the best and additional integer ambiguity combinations.

In one embodiment, the measure of spread is or comprises a range of locations of the best and additional integer ambiguity combinations in the integer ambiguity combination search space. In another embodiment, the measure of spread is or comprises a range of locations of the parameter estimates corresponding to the best and additional integer ambiguity combinations in the parameter space.

Exemplary ways to carry out steps s40 and s50 are further explained below in relation to steps 6 and 7 described with reference to FIG. 20, and schematically illustrated with reference to FIGS. 21 and 22 for the horizontal and vertical protection levels.

FIG. 1 schematically illustrates the operations of the method as sequential steps s10 to s50. For processing NSS observations relating to one receiver epoch, the steps may be performed sequentially. However, the operations of the method may also be carried out in parallel, for example for successive receiver epochs, thus continuously, or at least at regular or irregular intervals, providing protections levels relating to one or more receiver epochs.

In one embodiment, the protection level(s), or some of them, are generated at the receiver epoch rate. In another embodiment, the protection level(s), or some of them, are generated at a lower rate than the receiver epoch rate. In one embodiment, the protection level estimates are updated every time a new set of measurements are used to update the float solution, and/or every time the float solution is propagated using the filter (regarding the meaning of "filter" here, see above discussion of step s10).

Further, some of the above-described steps may be combined. In one embodiment, steps s30 and s40 are combined in the sense that the measure of spread of the best and additional integer ambiguity combinations may be determined without explicitly adding the additional integer ambiguity combinations to a list. For example, the error norms of the additional integer ambiguity combinations may be accumulated in increasing order until their accumulated error norms, together with the error norm of the best integer ambiguity combination, jointly satisfy the integrity risk.

Figure 2A:
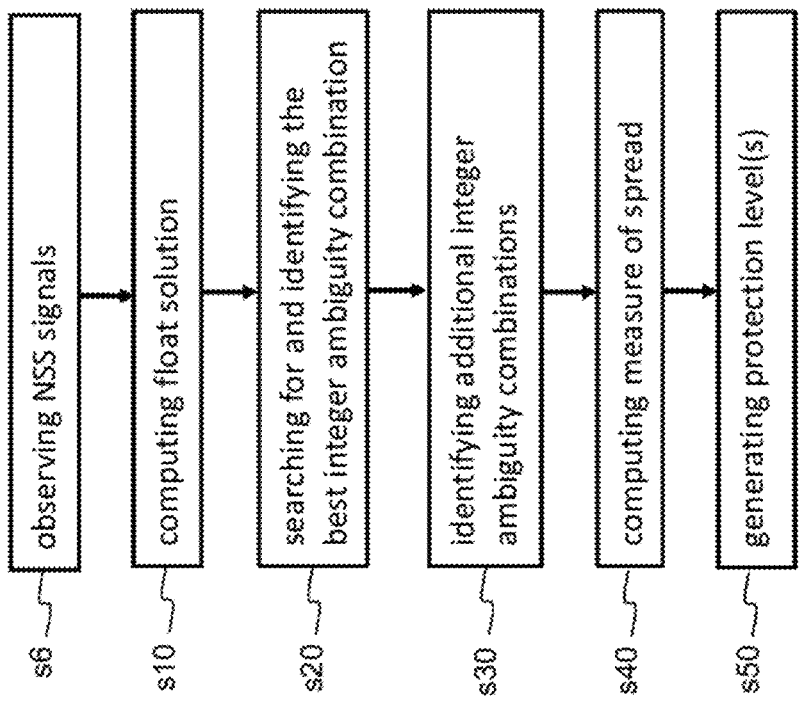
FIG. 2a is a flowchart of a method in one embodiment of the invention, further comprising a step of observing NSS signals.

FIG. 2a is a flowchart of a method in one embodiment of the invention, further comprising a step s6 of observing NSS signals. That is, in this embodiment, steps s10 to s50 are carried out at least by an NSS receiver, and the NSS receiver also carries out step s6 of observing NSS signals.

FIG. 2b is a flowchart of a method in another embodiment of the invention, wherein, in contrast to FIG. 2a, an NSS receiver observes NSS signals and, then, the NSS receiver transmits data representing the observed NSS signals to another processing entity or set of processing entities in charge of steps 10 to s50. The data representing the observed NSS signals may for example be transmitted in the form of data packets, such as IP packets, through, for example, any one of, or a combination of, the Internet, a cellular network, and a satellite link (e.g. using the L-band). In one embodiment, the data representing the observed NSS signals is transmitted in real-time, i.e. as soon as available (in line with the above-mentioned definition of the term "real-time"). In one embodiment, the data representing the observed NSS signals is transmitted as a data stream in that messages containing said data are transmitted at regular or irregular intervals through the same communication medium or channel. The data representing the observed NSS signals may be encoded and/or encrypted prior to transmission.

FIG. 3 is a flowchart of a method in one embodiment of the invention, further comprising making use of the above-described protection level(s) after the above-described generation of the protection level(s), as represented for conciseness in FIG. 3 by the ellipsis " . . . " above step s60. Namely, an alert limit is associated with each protection level. An alert limit is a maximum allowable uncertainty in the estimate that is considered acceptable for the application under consideration. The method comprises determining s60 whether any of the protection level(s) exceeds its respective alert limit, and, if so, refraining s70 from using the estimate, or part of the estimate, for the application. This presents the advantage of preventing the application from using potentially untrustworthy parameter estimates within the meaning of the integrity risk specified for the application.

In one embodiment, if it has been determined that all of the protection levels (or, if there is only one protection level, the protection level) do not exceed their respective alert limit, the application then makes use of the estimate, i.e. the estimated parameters. In one embodiment, if it has been determined that one or some of the protection levels exceeds their respective alert limit, the application uses the estimates whose protection levels have been determined not to exceed their respective alert limit, and refrains from using the other estimated parameters. In one embodiment, the alert limit for the application is set by the user(s) in charge of designing and/or operating the application.

FIG. 4 is a flowchart of a method in one embodiment of the invention, further comprising, between step s10 of computing the float solution and step s20 of searching for and identifying the best integer ambiguity combination, a step s12 of transforming the float solution into a more orthogonal space. In one embodiment, the transformation is or comprises a Z-transformation, also called herein simply Z-transform. Exemplary ways to carry out step s12 are further described below in section H.4.1 (especially with reference to the LAMBDA method and equations (21) and (22)) as well as in relation to step 2 described with reference to FIG. 20. See also reference [28], p. 10, lines 3-13, and p. 23, line 18 to p. 24, line 2. Namely, the Z-transform is merely an example of transformation of the float solution into a more orthogonal space. From a computational standpoint, the Z-transform enables to efficiently cover the integer search space. Embodiments of the invention may be carried out without the Z-transform, but it may be advantageous to use the Z-transform for a practical implementation. Other decorrelation techniques, also sometimes called orthogonalization techniques, may be used (see e.g. reference [1], pp. 229-234). The decorrelation technique may result in a partial decorrelation, i.e. not necessarily a full decorrelation.

In one embodiment using a transformation as described above, the method further comprises, between steps s30 and s40, a reverse or inverse transformation (not illustrated in the drawings, for conciseness), such as a reverse Z-transform. In that respect, see also the description below of step 8 with reference to FIG. 20.

As mentioned in reference [28], p. 10, lines 15-18, the Z-transform differs from (and should not be confused with) a Fourier transform in the frequency domain. The Z-transform also differs from (and should not be confused with) the mapping of the float values from a $R^n$ real number space to a Zn integer number space.

FIG. 5a is a flowchart of a method in one embodiment of the invention, further comprising, between, first, computing s10 a float solution and, second, searching s20 for and identifying the best integer ambiguity combination, a step s14 of determining that the float solution's ambiguities have sufficiently converged. An exemplary way to implement step s14 is further described below in relation to step 3 discussed with reference to FIG. 20. In one embodiment, the convergence test comprises determining whether a quality measure of the float solution, such as the ambiguity dilution of precision (ADOP), is acceptable. In one embodiment, if it is determined that the float solution's ambiguities have not sufficiently converged, the method for generating protection level(s) may be interrupted, reset, or suspended until the convergence test is satisfied.

FIG. 5b is a flowchart of a method in one embodiment of the invention, comprising steps of transforming the float solution into a more orthogonal space and determining that the float solution's ambiguities have sufficiently converged. In other words, FIG. 5b combines the embodiments of FIGS. 4 and 5a, as an example illustrating that any group of embodiments of the invention may be combined to form further embodiments to the extent that they are not mutually exclusive, as mentioned above.

FIG. 6 is a flowchart of a method in one embodiment of the invention, further comprising, between, first, searching s20 for and identifying the best integer ambiguity combination and, second, identifying s30 the additional integer ambiguity combinations, a step s22 of computing a variance of unit weight, also called unit variance, based on the error norm of the best integer ambiguity combination. If the variance of unit weight is larger than 1 (and, in one embodiment, not greater than the critical value of the chi-squared distribution at a specified confidence level of say 99%), the float solution's covariance matrix is scaled s24 by multiplying it by the variance of unit weight, and adjusting the error norm. In this case, it is assumed that the measurement noise is larger than expected but still at an acceptable level. The variance of unit weight relates to how well the NSS measurements fit the underlying models used in the estimation of the float solution.

In one embodiment, if the variance of unit weight is smaller than or equal to 1, no scaling is performed. In this case, it is assumed that the underlying noise model(s) hold.

In one embodiment, if the variance of unit weight is significantly larger than 1 (i.e. as determined from a critical value of the chi-squared distribution at a specified confidence level of say 99%), the float filter may be reset. In this case, it is assumed that the float solution may contain outliers.

An exemplary way to implement steps s22 and s24 is further described below in relation to step 5 discussed with reference to FIG. 20. See also the explanations provided in reference [28], p. 36, lines 5-31.

In one embodiment, if the variance of unit weight is smaller than 1, the float solution's covariance matrix is scaled by multiplying it by the variance of unit weight, and the error norm is adjusted. For example, the covariance matrix of the float solution may be scaled not only when the variance of unit weight is larger than 1 (meaning that an optimistic choice of the statistical properties of the residual noise model has been made), but also when the variance of unit weight is smaller than 1 (meaning that a pessimistic choice of the statistical properties of the residual noise model has been made). In other words, if it is determined that the variance of unit weight is not statistically significantly different from 1.0, no scaling is performed and the error norm is not adjusted. If, in contrast, the variance of unit weight differs from 1.0, the covariance matrix of the float solution is scaled and the error norm is adjusted.

A margin around the value 1.0 may also be taken. For instance, step s24 may amount to checking whether the variance of unit weight is comprised between 1.0 minus epsilon and 1.0 plus epsilon, where epsilon is a margin comprised between 0.001 and 0.1, such as for example 0.05. Alternatively, the upper and lower bounds of the variance of unit weight may be determined from critical values of the chi-squared distribution.

In some embodiments, the scaling may be regarded as being used to adjust, or change, the statistical properties of the noise in equation (1) below. In particular, the scaling helps to account for the stochastic behavior of code and phase noise parameters $\epsilon_f^s$, and $\varepsilon_f^s$, respectively. Moreover, the scaling helps to account for minor deviations in the stochastic models of code and phase multipath ($M_f^s$, $m_f^s$) and ionospheric errors ($I^s$).

FIG. 7 is a flowchart of a method in one embodiment of the invention, wherein step s30 of identifying, among the set of other integer ambiguity combinations determined based on the float solution, the additional integer ambiguity combinations comprises: a step s32 of computing a search region bound based on the error norm of the best integer ambiguity combination and on the integrity risk; and a step s24 of determining the set of other integer ambiguity combinations based on the float solution and the computed search region bound. In other words, the search region bound is computed based on the error norm of the best integer ambiguity combination candidate and the specified integrity risk. The search region bound may be regarded as the bound used to gather all integer ambiguity combination candidates that have a probability greater than or equal to the integrity risk. An exemplary way to implement steps s32 and s34 is further described below in relation to step 6 discussed with reference to FIG. 20.

A search region, or integer ambiguity combination search region, may be regarded as a domain in which n-dimensional integer ambiguity candidates are searched over, where n is the number of carrier phase ambiguity parameters.

FIG. 8 is a flowchart of a method in one embodiment of the invention, wherein step s30 of identifying, among the set of other integer ambiguity combinations determined based on the float solution, the additional integer ambiguity combinations comprises: a step s36 of determining the set of other integer ambiguity combinations by selecting a number, here referred to as "candidate number", of integer ambiguity combinations around the float solution. In one embodiment, the candidate number is a number equal to or larger than $10^3$. In another embodiment, the candidate number is a number comprised between $10^5$ and $10^7$.

In other words, in the embodiment of FIG. 8, the requirement to formally specify the search space limits, i.e. the search region bound, is done away with, compared to the embodiment of FIG. 7. Defining a search region bound may be advantageous for an implementation of the method with limited computing power. However, with larger computing power, such as parallel computing (e.g. using a graphics processing unit), a large or very large number of integer ambiguity combination candidates may be generated, for example simultaneously, to then swiftly determine the top (d) candidates (with d being a positive integer) and their spatial distribution, without necessarily generating the search region bound first. In the embodiment of FIG. 8, for example $10^5$ integer ambiguity combination candidates may be generated, their error norms may be evaluated, and then the measure of spread may be determined, i.e. the measure of spread of those integer ambiguity combination candidates (the top (d) candidates) that have the smallest error norms that, together with the error norm of the best integer ambiguity combination, jointly satisfy the integrity risk.

FIG. 9 is a flowchart of a method in one embodiment of the invention, further comprising, after identifying s30 the additional integer ambiguity combinations, determining s38 that the number of identified additional integer ambiguity combinations is smaller than a threshold, the threshold being for example 1000 candidates. If the number of identified additional integer ambiguity combinations is larger than or equal to a threshold integer ambiguity, this may mean that the probability mass function is too flat. In this case, the solution is deemed unsatisfactory for high-integrity operation. An exemplary way to implement step s38 is further described below in relation to step 7 (after equation (26)) discussed with reference to FIG. 20.

In one embodiment, identifying s30 the additional integer ambiguity combinations comprises: identifying s30 those integer ambiguity combinations having the smallest error norms that, together with the error norm of the best integer ambiguity combination, jointly satisfy the integrity risk under the assumption that the float solution has a leptokurtic error distribution. That is, it is assumed that the error distribution of the float solution has heavy tails. The rationale is that, instead of assuming that the NSS measurements follow a Gaussian distribution and, hence, that the float solution also follows a Gaussian distribution, it has been recognized that the NSS measurements may in reality follow a probability distribution with heavier tails, so that the float solution does too. Thus, it may be advantageous to use a heavy-tailed error distribution for translating the error norms of the integer ambiguity combination candidates into a probability value. For example, a Student's t-distribution, a Pearson type IV distribution, a Laplace distribution, a logistic distribution, or empirically derived distributions may be used. Using a heavy-tailed error distribution generally results in including more integer ambiguity combination candidates in the search to cover a specified integrity risk (as reflected for example by equations (7) and (19)). This may better reflect the reality that a larger proportion of the errors may reside in the tails rather than in the body of the "bell" of the probability distribution function.

Figure 18:
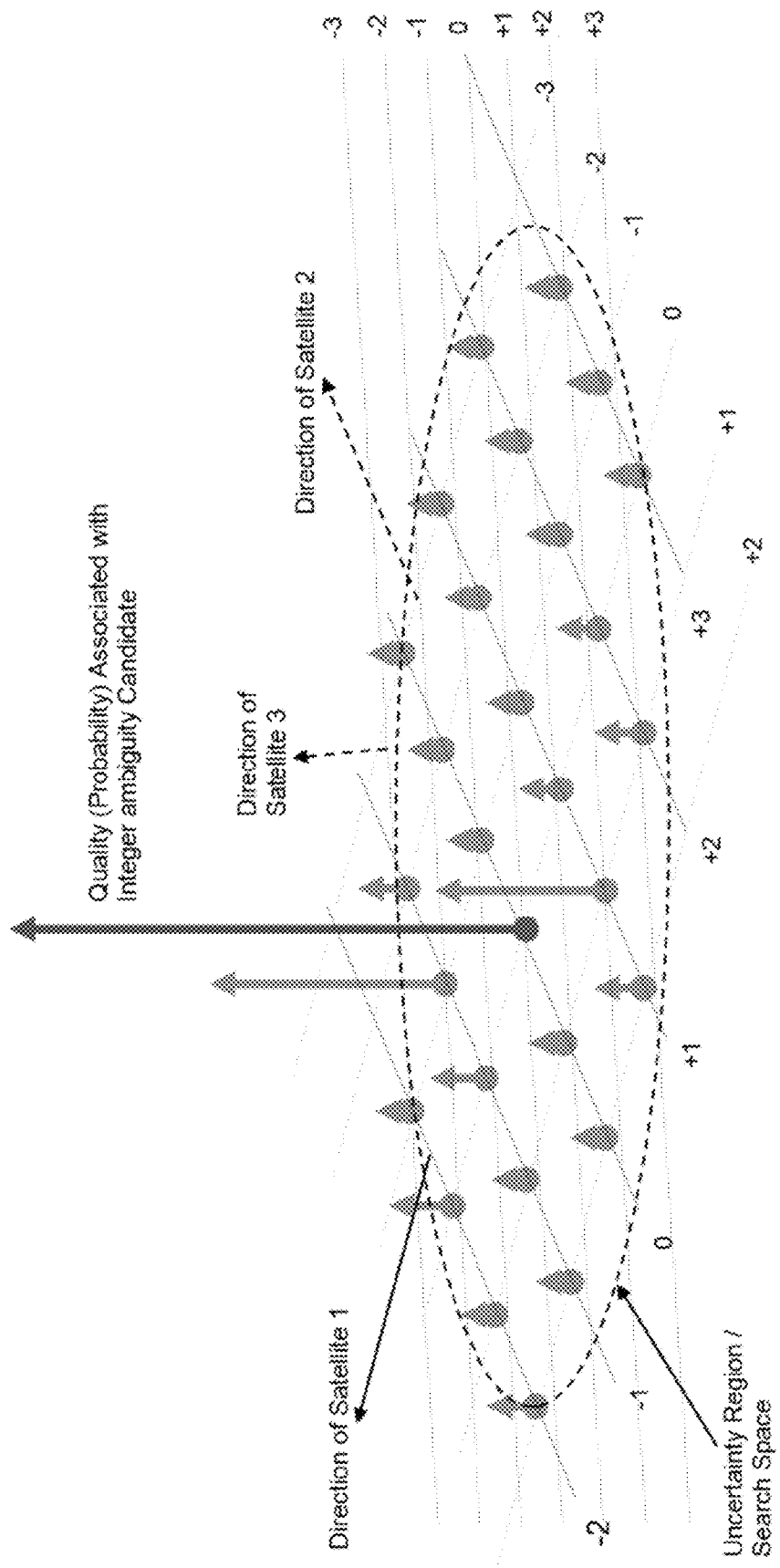
FIG. 18 schematically illustrates the integer ambiguity search space for the two-dimensional example shown in FIG. 15, to help understand the context in which some embodiments of the invention have been developed.
Figure 18A:
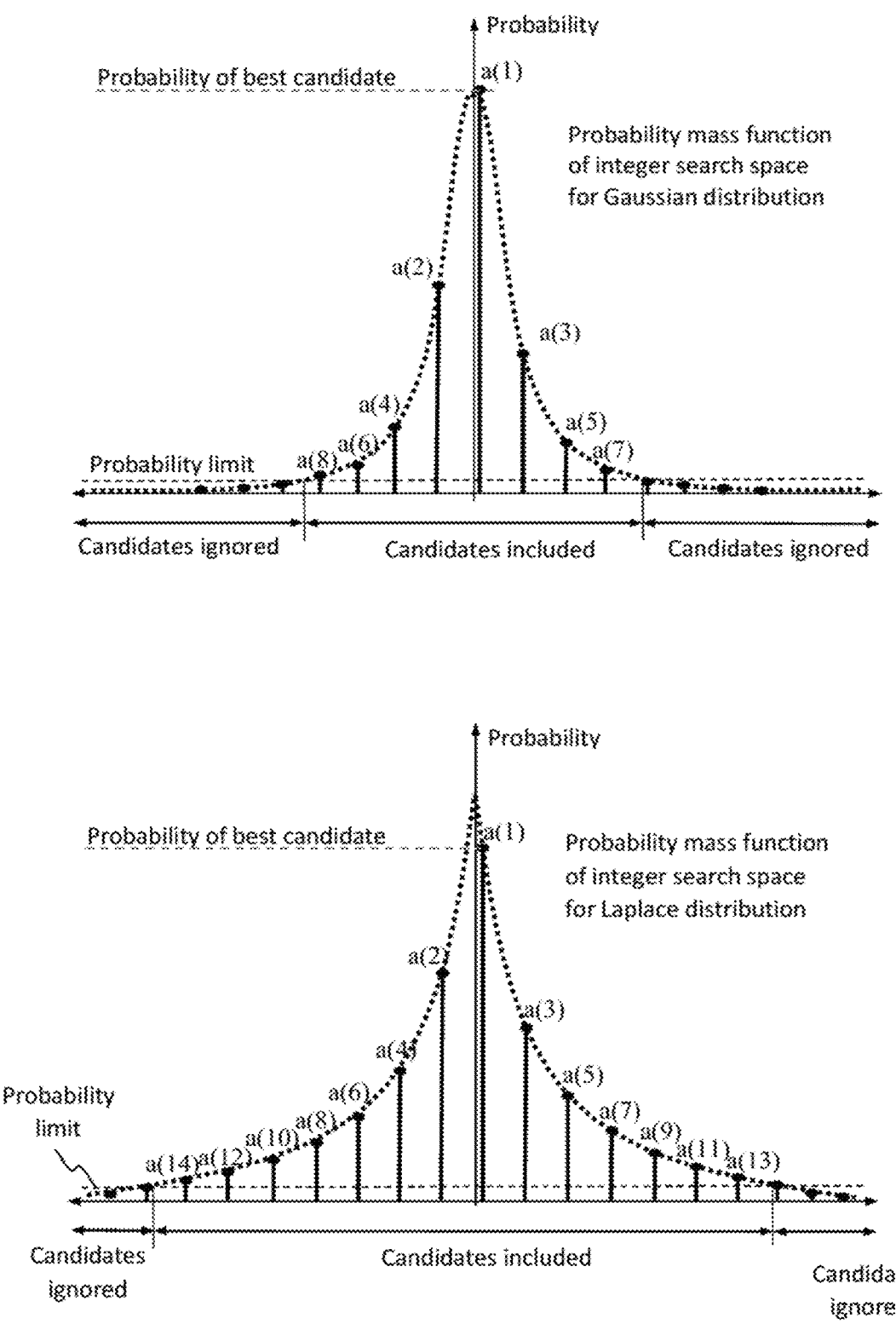
FIG. 18a schematically illustrates a one-dimensional example of the difference in integer ambiguity candidates generated with two assumed float solution error distributions: i) a Gaussian float solution error distribution (upper half of FIG. 18a), and ii) a Laplace float solution error distribution (lower half of FIG. 18a), to help understand the context in which some embodiments of the invention have been developed.

FIG. 18a illustrates the probability mass function generated from a Gaussian distribution (top) and a Laplace distribution (bottom) considering just a single ambiguity dimension. In practice, a multivariate distribution is generally needed for n-dimensional ambiguity candidates. In the examples shown in FIG. 18a, the Gaussian distribution produces less candidates than the Laplace distribution, assuming that a fixed probability limit is used. The use of other distributions may likewise yield more or less ambiguity candidates for a specific probability limit.

In one embodiment, an error distribution having a kurtosis larger than 3.05 is assumed. In another embodiment, an error distribution with a kurtosis larger than 3.1 is assumed. The optimal kurtosis value may be determined and/or tuned empirically.

In one embodiment, computing s40 a measure of spread comprises at least one of: (i) computing the difference between the maximum and minimum values among the positions in a coordinate frame corresponding to the best and additional integer ambiguity combinations; and (ii) computing the difference between the maximum and minimum values among the values of the parameter, or the differences between the maximum and minimum values among the values of the parameters, derivable from the best and additional ambiguity combinations.

In one embodiment, generating s50 the protection level(s) based on the computed measure of spread comprises: generating at least one of: a horizontal position protection level; a vertical position protection level; an along-track position protection level; a cross-track position protection level; a position protection level up relative to a track; a radial position protection level relative to a track; an ionospheric bias protection level; a tropospheric bias protection level; a satellite ephemeris bias protection level; a satellite clock bias protection level; a code multipath protection level; and a GLONASS frequency-dependent bias protection level. Some of the protection levels may be generated per satellite.

More specifically, in one embodiment, generating s50 the protection level(s) based on the computed measure of spread comprises: generating, for each of a plurality of satellites, at least: an ionospheric bias protection level; a tropospheric bias protection level; a satellite ephemeris bias protection level; a satellite clock bias protection level; and a code multipath protection level. This embodiment may be advantageous when using the protection level generation method in association with a correction stream broadcast service (as discussed above, see also e.g. references [33] and [34]). A correction data stream may be generated using one or more NSS reference receivers, but preferably many reference receivers are used, such as more than 100 global reference receivers and many regional reference receivers. Generating protection levels may be performed separately for each of the reference receivers and, then, the generated protection levels may be aggregated into protection levels corresponding to the parameters broadcast as part of the correction data stream.

In one embodiment, the parameter estimates and the protection level(s) are generated in real-time, i.e. as soon as available (in line with the above-mentioned definition of the term "real-time"). In another embodiment, the parameter estimates are generated in real-time whereas the protection level(s) are generated as part of a data post-processing process. In yet another embodiment, the parameter estimates and the protection level(s) are both generated as part of a data post-processing process. Road center-line information is useful for autonomous car navigation and therefore it is desirable that center-line data has both high accuracy and integrity. The center-line data may be derived from post-processing of survey vehicle GNSS data. The protection levels generated from the post-processing results should meet the accuracy requirements of the center-line database (say 0.1 m) in order for the data to be deemed useable.

Before discussing further embodiments of the invention, let us now further explain, in sections A to 1.2 below, the context in which some embodiments of the invention have been developed, for a better understanding thereof, as well as some technical considerations that may be helpful for understanding some embodiments of the invention and problems addressed by these embodiments.

A. Introduction to the Context in which Some Embodiments of the Invention have been Developed There is considerable interest in the use of GNSS, such as the GPS, GLONASS, Galileo, BDS, QZSS, and IRNSS (NAVIC), systems, for high-accuracy, transportation applications. High-precision GNSS generally refers to applications that demand better than meter-level positioning precision and typically centimeter-level precision. High-precision GNSS techniques have been well established since the first commercial real-time kinematic (RTK) products were released in the 1990s (see reference [14]). High-precision GNSS has evolved over the past 30 years to include the following general classifications:

Single-baseline RTK,
Network RTK/Virtual reference station RTK
Global precise point positioning (PPP)
Regionally-augmented PPP The classifications used above relate to how satellite-dependent, and atmospheric-dependent error sources are sampled, differential corrections computed, delivered and applied in user equipment. For the purposes of the present discussion, any of these techniques may be used. Generally, differential corrections are available for the user to reduce the impact of satellite clock, satellite ephemeris, and atmospheric errors.

High-precision GNSS techniques demand the use of GNSS carrier phase measurements. Carrier phase measurements have millimeter-level precision. However, they are biased by an initial integer cycle ambiguity. The integer ambiguity represents the whole number of carrier cycles between NSS receiver antenna phase center and satellite transmitter antenna phase center, at the commencement of tracking. A new integer ambiguity term arises every time carrier phase tracking is interrupted on a given signal, i.e. there is a cycle slip. Centimeter-level positioning accuracy is generally best achieved by exploiting the known integer ambiguity terms on the tracked signals.

Considerable research has been devoted to integer ambiguity resolution (see references [9], [11], [6], and [16]). Integer ambiguity resolution is a statistical process and therefore contains a probability of selecting incorrect values (see reference [19]). The impact of selecting the wrong integer ambiguity values may be significant. That is, position errors at decimeter- to meter-level may arise, even though the reported precisions may be at centimeter-level.

Today, high-precision GNSS techniques are used for many non-safety-of-life applications. For such applications, results are provided to the user together with an associated 1-sigma estimate of the uncertainty of the horizontal and vertical component errors. It is generally understood that the true position of the NSS receiver should reside within a confidence region defined by the +/−1 sigma error bound, approximately 68% of the time. Emerging safety-of-life transportation applications demand high levels of integrity and require more or far more stringent bounds on the actual horizontal and vertical position errors. GNSS integrity concepts are mature for meter-level aviation navigation (see reference [26]). For high-integrity GNSS, the precision of the position estimates is quantified at high or very high confidence levels (e.g. 99.99999%), in terms of horizontal- and vertical-protection levels, given in meters. In other words, the probability that the position error exceeds the protection level is small or very small and is equal to the integrity risk (e.g. $5.10^{-7}$).

In this context, some embodiments of the invention relate to new methods for computing, i.e. generating, protection levels for high-precision GNSS applications relying on carrier phase integer ambiguity resolution. These protection level generation techniques may, in some embodiments of the invention, be applied to all carrier-phase based GNSS positioning applications such as single-baseline RTK, network RTK, PPP, and regionally-augmented PPP. The techniques are suitable for real-time, or off-line computation, and may be readily formed as part of the ambiguity estimation process, in some embodiments of the invention.

B. Aviation Experience

GNSS pseudorange integrity monitoring techniques are based on a framework of reference stations that determine satellite and atmospheric errors over the coverage region and distribute these corrections to users via differential corrections. The correction stream includes correction parameters, plus integrity messages that identify GNSS faults and anomalies such as satellite failures and out-of-tolerance atmospheric events. In the case of satellite-based augmentation systems (SBAS), such as WAAS, EGNOS, MSAS, etc., the correction stream is distributed to users via satellite link.

User equipment applies the differential corrections to corresponding satellite pseudoranges, thus reducing the error bound on the measurements. The remaining pseudorange errors include:
- residual ionospheric bias,
- residual tropospheric bias,
- code multipath, and
- residual satellite ephemeris and clock bias.

The corrected pseudorange measurements are used to compute position and associate precisions via single-epoch (snapshot) least-squares techniques.

User equipment is also responsible for statistical testing of pseudorange measurements to identify and remove any measurement outliers as part of a receiver autonomous integrity monitoring (RAIM) process. Early RAIM techniques assumed that only a single measurement failure could occur (see reference [10]). The advent of multiple satellite constellations has facilitated the development of more rigorous methods for validating measurements and the estimated position states (see reference [7]). Advanced RAIM (ARAIM) methods are aimed at supporting more demanding phases of flight, especially precision approach and landing operations with vertical guidance.

The civil aviation environment is generally favourable for GNSS operation with all satellites in view tracked and with relatively low multipath errors. Satellite geometry is generally strong enough to ensure high integrity and high availability of meter-level positioning for non-precision navigation.

Although the aviation applications may differ to a certain extent from urban ground-based transportation applications, some of the high-level integrity concepts developed for aviation have general applicability. In particular, all error sources affecting the GNSS position estimation process should be, preferably comprehensively, characterized and quantified.

C. Protection Levels

Safety-of-life applications demand strict adherence to high levels of integrity. Integrity in this case refers to a measure of trust that can be placed on the correctness of the information supplied by the navigation system.

GNSS receivers generally report estimated position precisions at a specific confidence level, e.g. 68%. It is understood that there is a probability that a small percentage of position estimates will fall outside three times the reported (68%) precisions. For high-integrity applications, more or far more stringent thresholds are specified.

Figure 11:
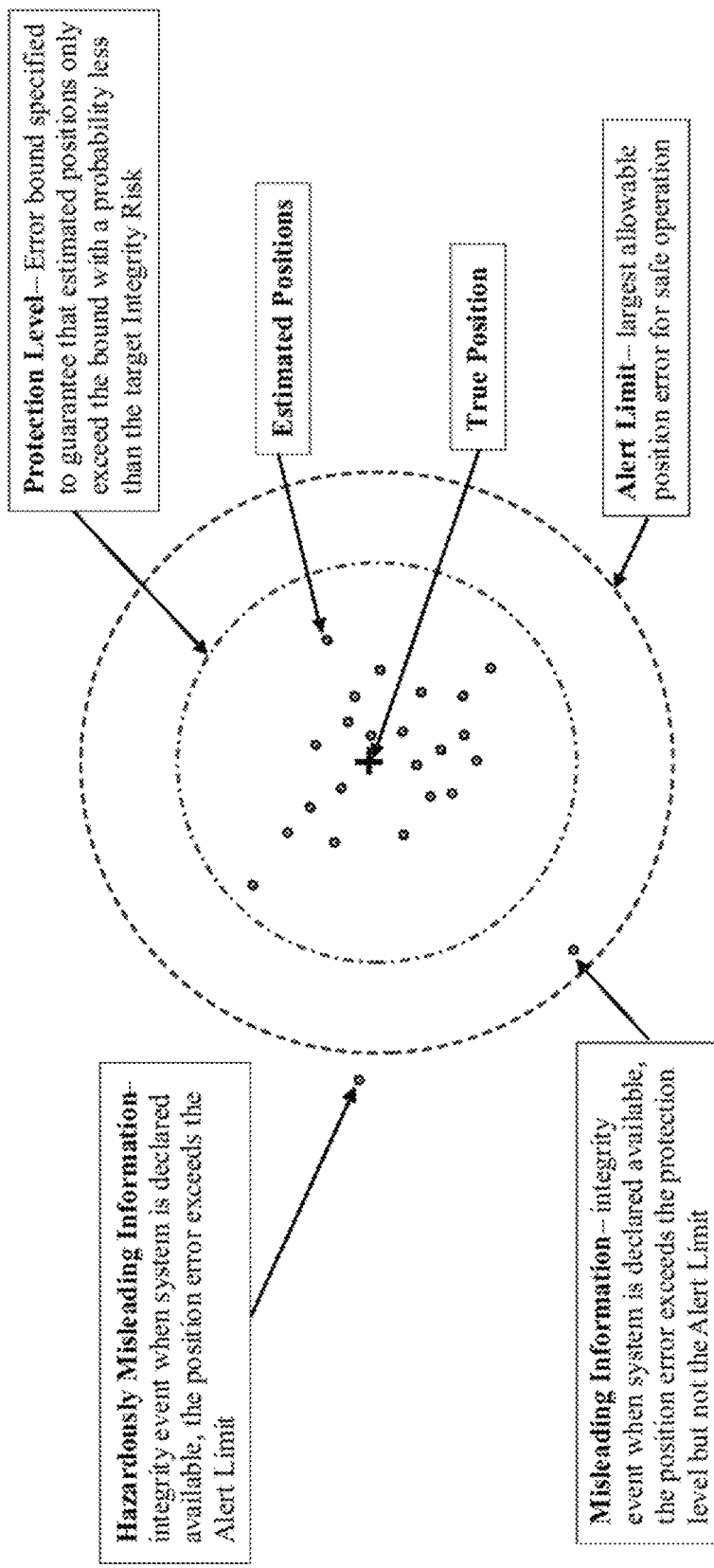
FIG. 11 schematically illustrates the relationship between integrity parameters, to help understand the context in which some embodiments of the invention have been developed (FIG. 11 is adapted from FIG. 3 of reference [27])

Protection levels are statistical error bounds that are produced to guarantee that position estimates will only exceed this level with low or very low probability (integrity risk). Protection levels may be split into horizontal and vertical components, i.e. the horizontal protection level (HPL) and vertical protection level (VPL) respectively. The HPL is the radius of a circle, in the horizontal plane, with its center at the true position, that represents the region assured to contain the estimated horizontal position. The VPL is centered on the true vertical position and represents the vertical region in which the estimated vertical position is assumed to reside (see FIG. 11, adapted from FIG. 3 of reference [27]). Reference [27] defines a set of integrity concepts used for GNSS navigation.

Protection level computation involves propagating assumed GNSS measurement uncertainty into the position domain via the prevailing geometric strength of the estimator. This calculation is analogous to how GDOP is used to propagate NSS receiver range error into the assumed position uncertainty. The distribution of all GNSS measurement errors are characterized and quantized for determining the protection levels.

The alert limit (AL) defines the magnitude of error that can be tolerated for a given application. For example, autonomous car navigation may require cross-track error to be smaller than 0.5 m (i.e. alert limit=0.5 m). If the protection level exceeds the alert limit, the positioning system is deemed to be unusable. A hazardously misleading information event occurs if the estimated position falls outside the alert limit, but the protection level is below the alert limit.

D. Urban Environment Challenges

Figure 12:
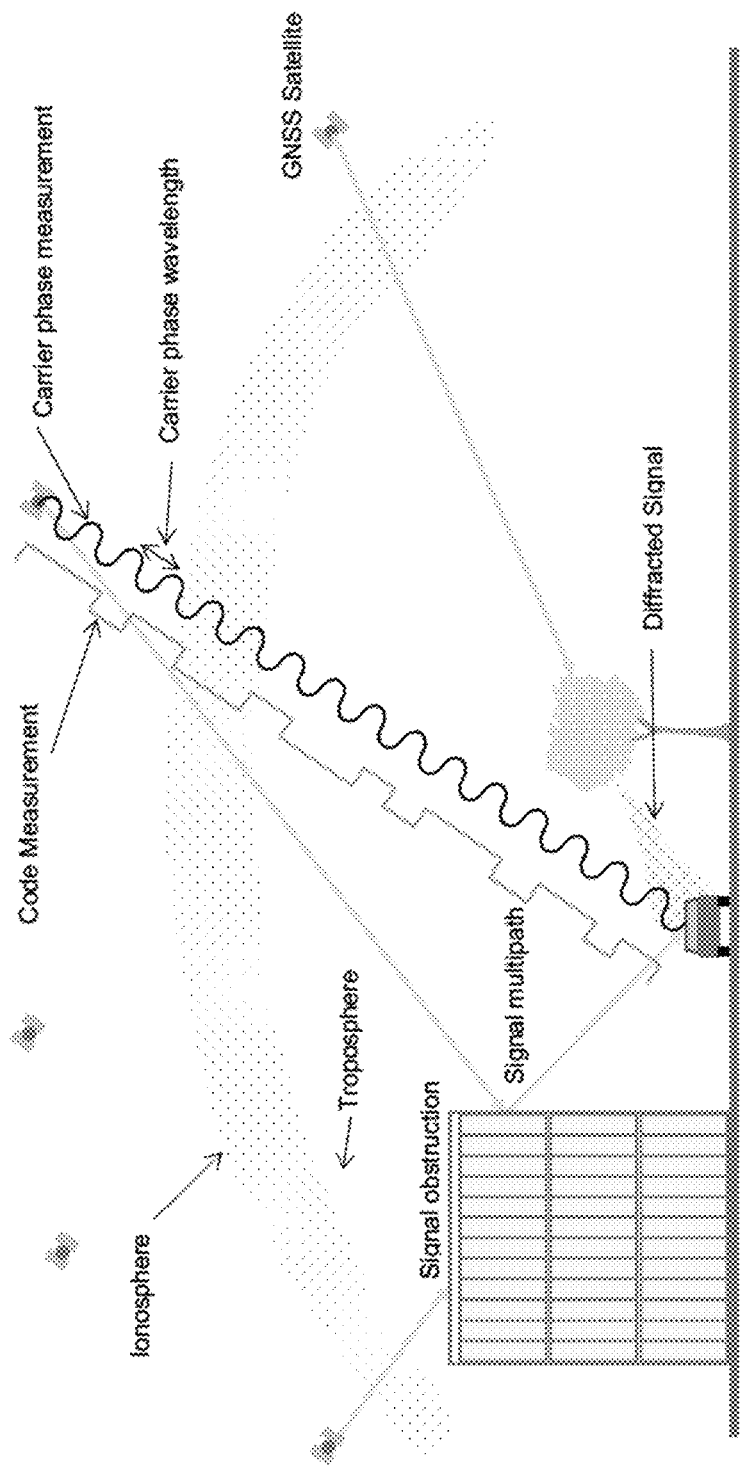
FIG. 12 schematically illustrates GNSS code and carrier phase measurements and various error sources prevalent in urban tracking environments, to help understand the context in which some embodiments of the invention have been developed.

Urban environments are challenging for GNSS signal tracking (see FIG. 12, illustrating GNSS code and carrier phase measurements and various error sources prevalent in urban tracking environments). First, signal obstructions are common and therefore the number of tracked signals is reduced compared to open-sky operation. Second, signal multipath and diffraction can reach values larger than 10 cm for phase and values larger than 100 m for code measurements. Finally, the dynamic nature of vehicle tracking means that carrier phase tracking is frequently interrupted, thus complicating ambiguity resolution and reducing the availability of high-precision solutions.

Integrity monitoring techniques developed for aviation assume single-faults, and they do not translate well to urban environments where large carrier and code multipath errors may be frequent. The conventional RAIM approach of sequentially rejecting single-satellite measurements from processing is practical for a single-epoch least squares solution but is generally unsuitable for the high-precision filtering techniques described below.

E. GNSS Measurement Models

Carrier phase measurements are regarded as a significant driver of high-precision GNSS positioning. Code measurements support carrier phase positioning by providing an approximate and unambiguous location of the NSS receiver.

The general single-difference (common satellite) measurement models for GNSS code and carrier phase are given by:

$$R_f^s = \rho^s + T^s + t + \nabla t^s + \gamma_f I^s + \tau + B^s + M_f^s + \epsilon_f^s \quad (1)$$

$$\phi_f^s = \rho^s + T^s + t + \nabla t^s - \gamma_f I^s + \tau + b^s + m_f^s + \kappa_f^s \beta^s + \delta_f^s + \lambda_f \omega + \lambda_f n_f^s + \epsilon_f^s \quad (2)$$

where:

$R_f^s$ is the code-based pseudorange measurement on frequency band f, to satellite s;

$\rho^s$ is the geometric range from NSS receiver to satellite, containing satellite coordinates ($X^s$, $Y^s$, $Z^s$), and NSS receiver antenna coordinates (x,y,z):

$$\rho^s = \sqrt{(X^s-x)+(Y^s-y)^2+(Z^s-z)^2};$$

$T^s$ is the satellite clock error;

t is the master receiver clock error;

$\nabla t^s$ is the receiver clock difference of satellite system with respect to master satellite system;

$I^s$ is the ionospheric bias, ($\gamma_f$=ionospheric frequency factor);

$I^s$ the tropospheric error;

$B^s$ is the system dependent code bias;

$M_f^s$ is the code multipath error;

$\epsilon_f^s$ is the code measurement noise;

$\phi_f^s$ is the carrier phase measurement on frequency f, to satellite 5, $b^s$ is the system dependent phase bias;
$m_f^s$ is the carrier phase multipath error;
$\beta^s$ is the GLONASS frequency dependent bias term ($\kappa_f^s$=GLONASS channel number);
$\delta_f^s$ is the antenna phase center offset;
$\omega$ is the antenna phase windup;
$n_f^s$ is the integer cycle ambiguity term ($\lambda_f$=carrier wavelength);
$\varepsilon_f^s$ is the phase measurement noise;

Table 1 summarizes the errors affecting GNSS code and carrier phase measurements and describes a suitable state description and stochastic model for each error. Differential corrections generated from one or more reference receivers operating near the NSS receiver help reduce the impact of satellite-related errors and atmospheric bias. Many other model components such as multipath and carrier phase ambiguities are specific to the NSS receiver and therefore should be modelled and estimated.

TABLE 1

Summary of possible GNSS code and carrier phase measurement model components

| Model component | Description | Suitable stochastic model in NSS receiver | Number of estimated parameters | Differential correction | Integrity handling |
|---|---|---|---|---|---|
| NSS receiver position | NSS receiver position states often estimated as part of a dynamic position, velocity, and/or acceleration model | Newtonian, Singer, or random walk | 3 (position) 6 (position + velocity) 9 (position + velocity + acceleration) | None | RAIM algorithm |
| Satellite ephemeris error | Difference between actual- and predicted ephemeris | Not Estimated | 0 | Estimated and largely removed | Out-of-tolerance events detected and flagged by network |
| Satellite clock error | Difference between actual and predicted clock behavior | Not Estimated | 0 | Estimated and largely removed | Out-of-tolerance events detected and flagged by network |
| Master receiver clock | Difference between receiver clock and GNSS system time of master satellite system. Often estimated as part of a dynamic clock-offset/clock rate model. | White noise, or random walk | 1 | None | Estimated as part of RAIM algorithm |
| Receiver clock difference | Difference of each respective satellite system to master receiver clock error | White noise | 1 per satellite system (excluding master satellite system) | None | Statistically bounded |
| Ionospheric bias | Frequency-dependent code-delay/phase-advance. Spatial and temporal variation (anisotropic) | First-order Gauss-Markov | 1 per satellite | Reduction of ionospheric bias dependent on separation from reference stations and level of ionospheric gradient | Ionospheric scintillation and out-of-tolerance ionospheric gradients flagged by network |
| Tropospheric bias | Proportion of tropospheric bias can be corrected, while wet component can be estimated via zenith delay and NS/EW gradient components | Random Walk | 1 zenith delay 2 gradient components | Reduction of tropospheric bias dependent on separation from reference stations and prevailing atmospheric conditions | Statistically bounded |
| Code multipath | Due to reflection of GNSS signals off one or more objects surrounding antenna - in extreme situations, only indirect/reflected signal received | Gauss-Markov | 1 per satellite/band | None | Statistically bounded |
| Phase multipath | Due to reflection of GNSS signals. Also consider diffraction errors as part of phase multipath | Gauss-Markov | 1 per satellite/band | None | Statistically bounded |
| GLONASS frequency dependent bias | Caused by varied delays in receiver radio frequency filters due to different GLONASS satellite frequencies | Random walk | 1 per GLONASS band | None | Statistically bounded |

TABLE 1-continued

Summary of possible GNSS code and carrier phase measurement model components

| Model component | Description | Suitable stochastic model in NSS receiver | Number of estimated parameters | Differential correction | Integrity handling |
|---|---|---|---|---|---|
| Antenna phase center offset | Caused by elevation, and potentially azimuthal variation in signal delays in antenna. Generally small and calibrated for high precision antennas, but contribute an error source for low-quality antennas | None | 0 | None | Statistically bounded |
| Antenna phase windup | Predominantly effect due to rotation of antenna about boresight axis | Random walk | 1 | None | Statistically bounded |
| Carrier phase ambiguity | Number of integer carrier phase cycles between NSS receiver and satellite at the commencement of signal tracking. Resolution may require statistical testing and validation | Random constant or random walk with small driving noise | 1 per satellite/band | None | Large error that should be resolved and validated by NSS receiver |
| Code measurement noise | Precision of pseudorange measurement by receiver | White noise | 0 Stochastic input | None | Statistically bounded |
| Carrier phase measurement noise | Precision of carrier phase measurements by receiver | White noise | 0 Stochastic input | None | Statistically bounded |

As shown in the last column in Table 1, many of the errors remaining in the GNSS measurements after differential correction are statistically bounded, that is, their magnitude and distribution is either known or can be derived from empirical studies. The final protection levels presented by a GNSS device should recognize the uncertainty in the solution as a result of the cumulative effect of the various measurement error sources. Phase ambiguity parameters represent largely unbounded errors on the carrier phase measurements. This is why the ambiguity resolution component is especially advantageous.

Note that there are a number of additional systematic error sources that may affect PPP applications, such as earth tides, ocean loading, etc. It may be assumed that these errors are adequately accounted for by appropriate correction models.

F. Parameter Estimation

Position-related parameters are of interest to many applications. However, as shown in Table 1, there are other nuisance parameters that should be considered for high-precision estimation. Kalman filtering can be directly applied to the estimation of a set of state parameters, including the position, clock, carrier phase ambiguities and other parameters. It is common to have for example 40 to 50 GNSS satellites above the local horizon in the Asia-Pacific region of the world as of 2019. More satellites are expected to be launched and then will be visible in the coming years. Moreover, GPS, GLONASS, QZSS and BeiDou satellites broadcast on two to three frequency bands, while Galileo satellites transmit on up to four frequency bands. The combination of many satellites and signal bands leads to the proliferation of state parameters that should be estimated, or at least modeled stochastically. Table 2 lists the state parameters estimated assuming 30 satellites (GPS, GLONASS, BeiDou, and Galileo), with two bands per satellite.

TABLE 2

Example of state parameter counts for 30 satellites, four satellite systems, and two tracking bands per satellite.

| State parameter | Number of allocated parameters |
|---|---|
| Position | 3 |
| Master receiver clock | 1 |
| Receiver clock difference | 3 |
| Tropospheric bias | 3 |
| Ionospheric bias | 30 |
| GLONASS frequency bias | 2 |
| Antenna phase windup | 1 |
| Code multipath | 30 × 2 = 60 |
| Phase multipath | 30 × 2 = 60 |
| Carrier phase ambiguity | 30 × 2 = 60 |
| Total | 223 |

Kalman filter operation counts are roughly proportional to the square of the number of state parameters. Thus, it is advantageous to minimize the number of parameters estimated. Therefore, rather than estimating all the parameters listed in Table 2 in a single filter, it is possible to use a distributed estimation technique (see reference [25]). In any case, the aim is to use GNSS code and carrier phase measurements to derive accurate state parameter estimates.

Detection, identification, and adaption of measurement outliers is an advantageous aspect of the estimation process, particularly in the context of high-integrity navigation. The impact of measurement outliers may persist in a Kalman filter for extended periods of time, in contrast to single-epoch (memory-free) least squares processing.

Standard Kalman filtering techniques assume that all state parameters are real-valued quantities and therefore the integer nature of the (double-difference) carrier phase ambiguity parameters is not directly exploited. Techniques exist for directly recognizing the integer nature of the carrier phase ambiguities during estimation (see reference [9]). Typically, the carrier phase ambiguity parameters are treated as real-valued (floating point) quantities and are estimated with all other parameters, giving rise to the so-called float solution.

G. Advantages of the Integer Ambiguity Resolution

Figure 13:
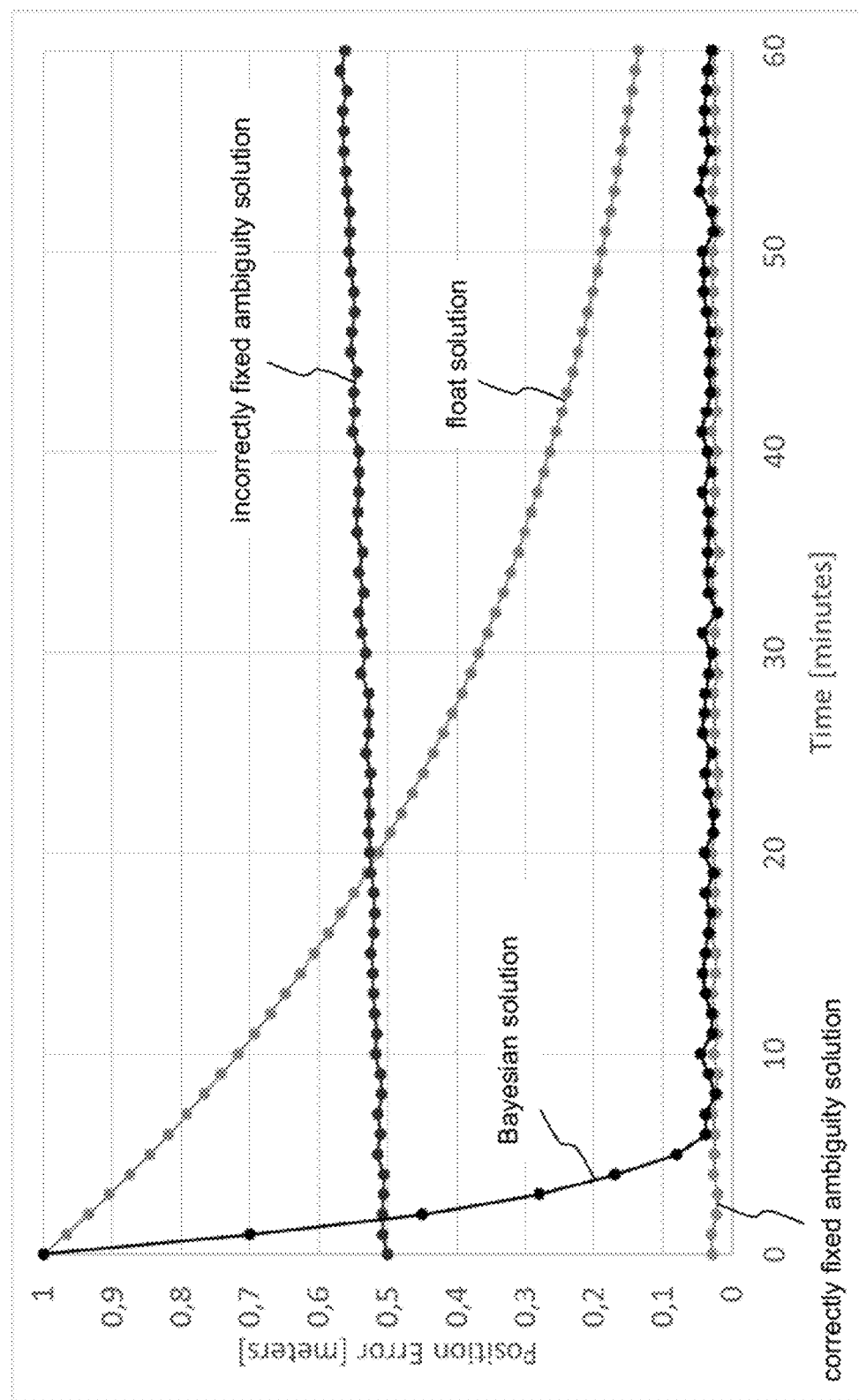
FIG. 13 schematically illustrates position errors produced from the float solution, correctly fixed ambiguity solution, incorrectly fixed ambiguity solution, and Bayesian solution, to help understand the context in which some embodiments of the invention have been developed (FIG. 13 is adapted from FIG. 5b of reference [28])

The float solution generated at each measurement epoch is not well overdetermined. The presence of carrier phase ambiguity, multipath and ionospheric bias states all contribute to a relaxed model. Constraining the ionospheric bias states helps accelerate convergence of short-baseline RTK processing. For PPP applications, the ionospheric bias is approximately known, giving rise to slow or very slow convergence of the estimated parameters (see curve labelled "float solution" in FIG. 13). FIG. 13 schematically illustrates position errors produced from the float solution, correctly fixed ambiguity solution, incorrectly fixed ambiguity solution, and Bayesian solution.

Constraining the float carrier phase ambiguities to their correct integer values significantly improves the precision of the remaining parameters (see curve labelled "correctly fixed ambiguity solution" in FIG. 13). Integer ambiguity resolution is a statistical process that carries a probability of fixing one or more ambiguities to the wrong value. Incorrect ambiguity resolution may lead to corresponding position errors of centimeters, up to meter-level errors (see curve labelled "incorrectly fixed ambiguity solution" in FIG. 13). Incorrect ambiguity resolution may mean that the error in the estimated position is much larger than the corresponding reported precisions.

Integer ambiguity resolution is, as of 2019, a mature component of high-precision GNSS products used in construction, agriculture, surveying and many other applications. Commercial high-precision GNSS products available today try to balance reliability and availability. New safety-of-life applications demand a more or far more stringent adherence to integrity. Moreover, it is advantageous that the ambiguity resolution technique used for high-integrity applications be capable of operating in all tracking environments, i.e. clear sky environment to harsh or extremely harsh environment (e.g. urban environment).

H. GNSS Ambiguity Resolution

H.1. Graphical Representation of Ambiguity Resolution

Figure 14:
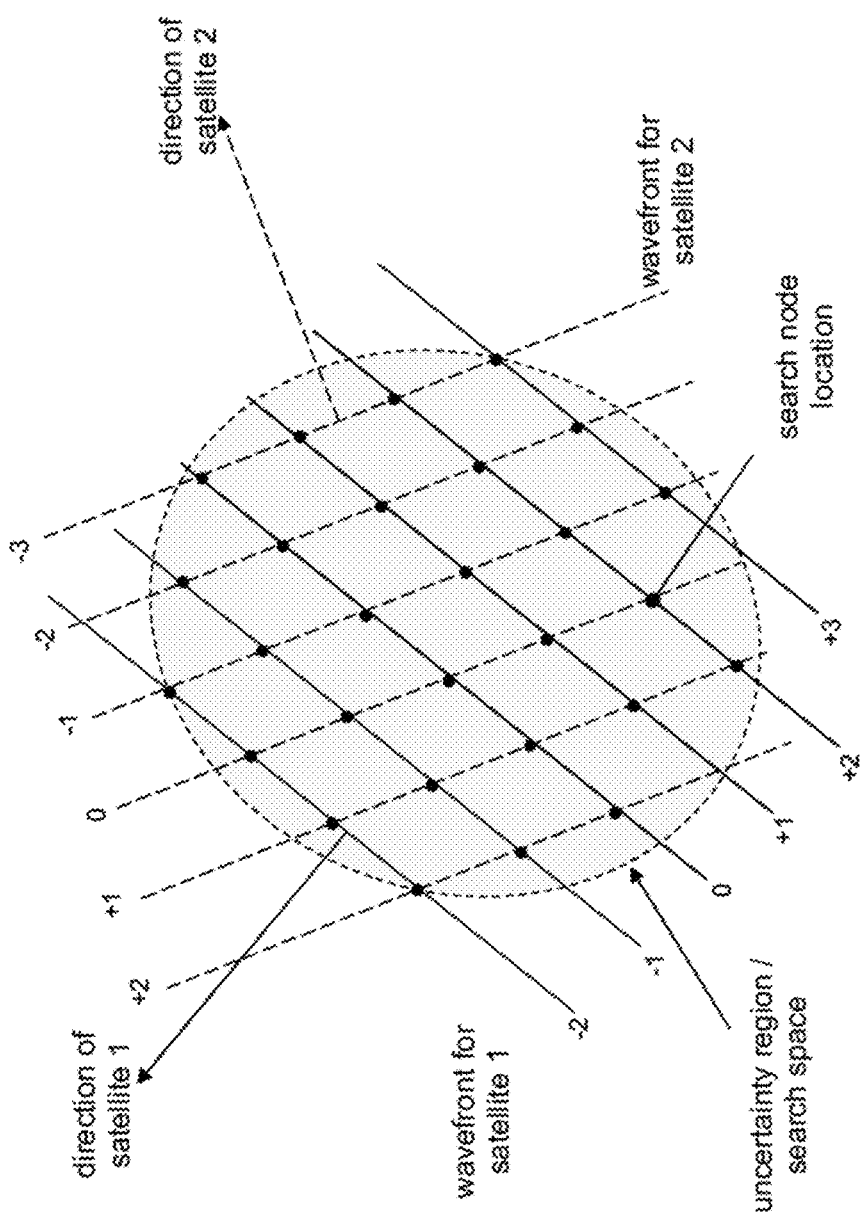
FIG. 14 schematically illustrates the integer carrier phase resolution problem in two dimensions with only two satellites, to help understand the context in which some embodiments of the invention have been developed (FIG. 14 is adapted from FIG. 2c of reference [28])

FIG. 14 schematically illustrates carrier phase ambiguity resolution in two dimensions. In the example, there are two satellites giving rise to two sets of intersecting wavefronts. The distance between each wavefront is equal to the carrier phase wavelength, which is approximately 20 cm for L-band GNSS measurements. Each wavefront corresponds to a possible integer ambiguity outcome for the respective satellite. The intersection of the integer wavefronts produces a series of search node locations within an uncertainty region. The dimension of the uncertainty region may initially be determined by code observations for each satellite. Over time, additional code and carrier phase measurements help the float solution to converge and thus reduce the dimension of the uncertainty region.

Figure 15:
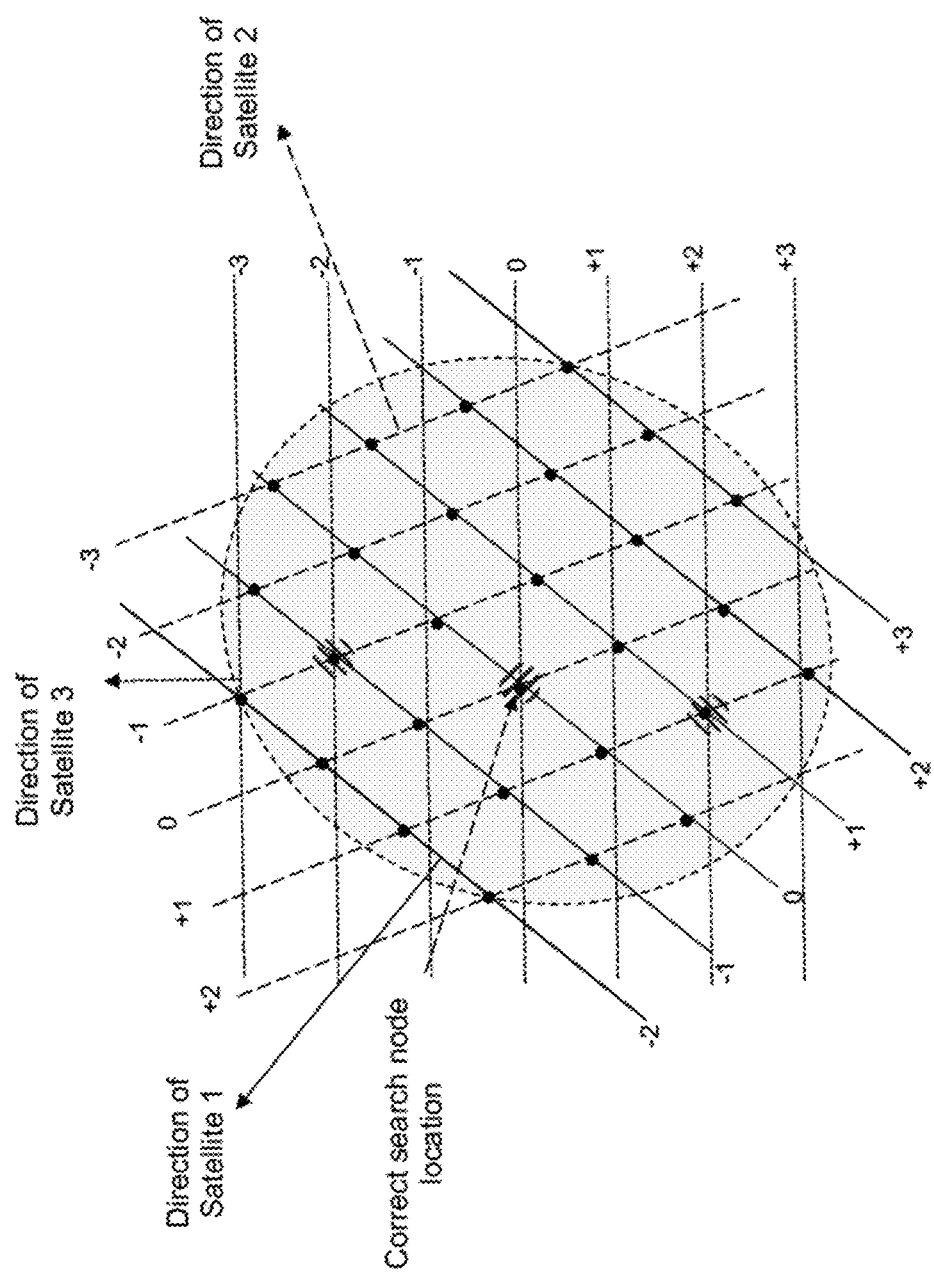
FIG. 15 schematically illustrates the integer carrier phase resolution problem in two dimensions with three satellites, to help understand the context in which some embodiments of the invention have been developed (FIG. 15 is adapted from FIG. 2d of reference [28])

With just two satellites, in the example of FIG. 14, there may be no way of determining the correct integer search node and the corresponding integer ambiguity values on satellite 1 and satellite 2. FIG. 15 schematically illustrates, in two dimensions, how integer wavefronts for a third satellite can help isolate the correct search node location. In this error-free example, the search node located at the intersection of all three wavefronts is the most likely location of the NSS receiver (i.e. satellite ambiguity combination (0, 0, 0), highlighted with descending diagonal hatching in FIG. 15). There are other search nodes that show strong agreement with the wavefront intersections, for example combinations (−1,−1,−2) and (+1,+1,+2), both highlighted with ascending diagonal hatching in FIG. 15.

Figure 16:
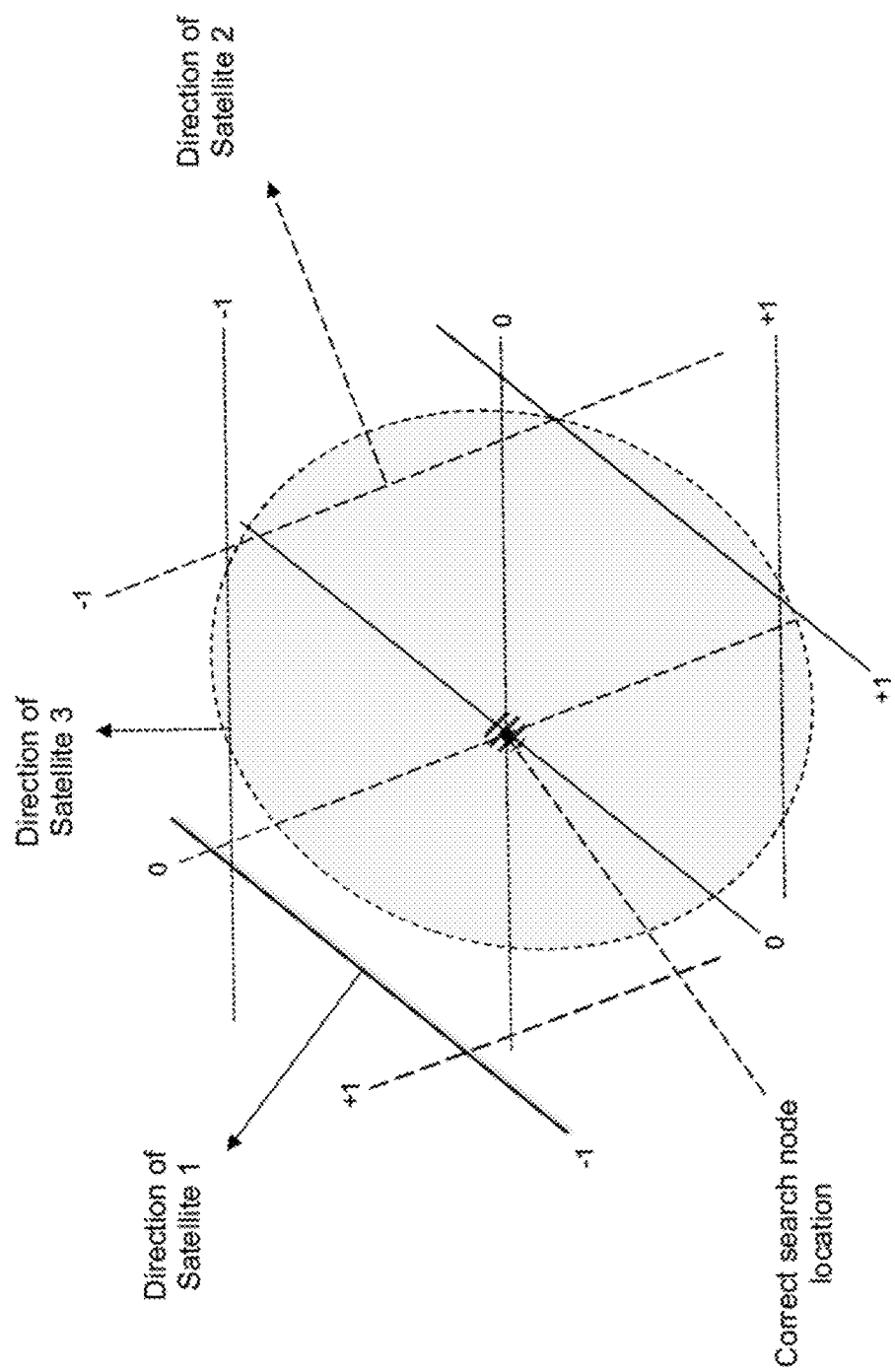
FIG. 16 schematically illustrates the wide-lane integer carrier phase resolution problem in two dimensions, to help understand the context in which some embodiments of the invention have been developed.

The addition of more satellites, and thus corresponding wavefronts, further strengthens the isolation of the correct search node. The addition of multi-band satellite carrier measurements greatly enhances the ability to discount incorrect search nodes and isolate the single correct integer ambiguity combination. Additional carrier band measurements enable either explicit formation of wide-lane combinations such as the L1-L2 phase combination (wavelength=86 cm), or implicitly via direct estimation and searching of all correlated carrier band ambiguities. FIG. 16 shows, in a two-dimension schematic illustration, the effect of wide-lane ambiguities on the search space. The increased separation of wavefronts leads to just a single correct integer ambiguity combination candidate residing within the search space in this example. That is, the correct integer ambiguity combination is the only search node falling within the uncertainty region.

Unlike the error-free examples presented in FIGS. 14 to 16, the ambiguity estimates may in reality be corrupted by unmodeled errors such as ionospheric bias, and multipath. An ambiguity bias on the estimate of satellite 3 causes a shift of the wavefronts, resulting in many incorrect ambiguity combination candidates showing tight wavefront intersections. That is, a shift in the wavefronts may cause a significant change in the perceived quality of each integer ambiguity combination candidate (see FIG. 17). Checks may be performed to validate the integer ambiguities to ensure that the selected integer ambiguity combination candidate is correct.

H.2. Mathematical Model

For the purposes of the development below, the linearized GNSS measurement model can be condensed and presented in terms of ambiguity parameters and all other parameters, as suggested in reference [21]:

$$E\{y\}=Aa+Bb, a\in Z^n, b\in R^p \quad (3)$$

with:

E{·}=mathematical expectation operator;
y=m-vector of measurements;
a=n-vector of integer ambiguities;
b=p-vector of non-ambiguity parameters (including position states and nuisance parameters);
A=m×n coefficient matrix of the ambiguities;
B=m×p coefficient matrix of all other parameters;

Measurement vector y comprises single-differenced code- and phase-observed-minus-predicted measurements. In the context of real-time processing, vector y is populated at each data epoch with new GNSS code and carrier phase measurements. As a first approximation, the distribution of the measurement errors is assumed to follow a multivariate normal distribution. In practice, the GNSS measurement error distribution may have long tails. This phenomenon is of concern for high-integrity applications.

H.3. Classical Approach to Ambiguity Resolution

A classical approach to GNSS carrier phase ambiguity resolution may involve the following steps (see reference [21]):

1. Float solution
2. Validation of the float solution
3. Integer solution
4. Validation of the integer solution
5. Fixed-integer solution
6. Solution monitoring H.3.1 Float Solution Although the ambiguity parameters are intrinsically integer valued, they are generally more readily estimated as floating-point numbers as part of a Kalman filtering, least squares, or other estimation technique. This leads to the so-called float solution:

$$\begin{bmatrix} \hat{a} \\ \hat{b} \end{bmatrix}; \begin{bmatrix} Q_{\hat{a}} & Q_{\hat{a}\hat{b}} \\ Q_{\hat{b}\hat{a}} & Q_{\hat{b}} \end{bmatrix} \quad (4)$$

where the (n×1) float ambiguity vector is composed of the individual float ambiguity estimates and for a dual-frequency GPS example, is given by:

$$\hat{a} = [\hat{n}_{L1}^1, \hat{n}_{L2}^1, \hat{n}_{L1}^2, \hat{n}_{L2}^2, \ldots \hat{n}_{L1}^s, \hat{n}_{L2}^s]^T \quad (5)$$

Using the definitions of non-ambiguity parameters in equations (1) and (2), the (p×1) vector of non-ambiguity parameters is given for example as:

$$\hat{b} = [\hat{x}, \hat{y}, \hat{z} | \hat{t} | \widehat{\nabla t}^{glon}, \widehat{\nabla t}^{gal}, \ldots | \hat{I}^1, \hat{I}^2, \ldots, \\ \hat{I}^s | \hat{\tau} | \hat{\beta}^{glon} | \ldots | \hat{m}_{L1}^1, \hat{m}_{L2}^1, \hat{m}_{L1}^2, \hat{m}_{L2}^2, \ldots, \hat{m}_{L1}^s, \\ \hat{m}_{L2}^s | \omega]^T \quad (6)$$

where glon refers to the GLONASS, and gal refers to the Galileo.

Note that for brevity, only a subset of all non-ambiguity parameters are included in equation (6).

Given that the measurements are assumed to follow a normal distribution, so too are the float solution estimates. The probability density function of the float ambiguities is therefore:

$$f_{\hat{a}}(x|a) = \frac{1}{(2\pi)^{\frac{n}{2}}\sqrt{\det(Q_{\hat{a}})}} \exp\left\{-\frac{1}{2}(x-a)^T Q_{\hat{a}}^{-1}(x-a)\right\} \quad (7)$$

H.3.2 Validation of the Float Solution

The quality of the float solution depends on the quality of the measurement and system models. The a-priori measurement noise model should faithfully describe true measurement errors. In urban GNSS tracking environments, carrier-phase and code-multipath errors are difficult to model. Residual ionospheric and tropospheric errors are likewise challenging to model. It is advantageous that the float solution estimation technique incorporates outlier detection and adaption to address measurement outliers. There are various known methods for validating least squares and Kalman filtering techniques, such as references [5] and [15].

The float solution is loosely constrained. Thus, one or more state parameters may erroneously absorb measurement errors without necessarily causing a detectable fault. Even with care, it should be assumed that the float solution is potentially corrupted by biases, which may cause one or more of the estimated parameters ($\hat{a},\hat{b}$) to be inconsistent with their associated covariance matrix ($Q_{\hat{a}}, Q_{\hat{a}\hat{b}}, Q_{\hat{b}}$).

H.3.3 Integer Solution

Integer ambiguity estimates ($\check{a}$) are derived from the float ambiguities via a mapping (S) defined by:

$$\check{a} = S(\hat{a}), S: R^n \Rightarrow Z^n \quad (8)$$

In classical integer ambiguity resolution, it may be assumed that $S(\hat{a})$ maps the float ambiguities to a single integer ambiguity combination candidate. Common mappings include integer least squares, integer bootstrapping, and integer rounding (see reference [21]). Integer least squares (ILS) involves minimizing the following error norm:

$$\Psi_{\check{a}_k} = (\hat{a} - \check{a}_k)^T Q_{\hat{a}}^{-1}(\hat{a} - \check{a}_k) \quad (9)$$

The error norm $\Psi_{\check{a}_k}$ represents the distance the integer ambiguity combination candidate is from the float ambiguity solution, as measured in the n-dimensional ambiguity domain. Small values of $\Psi_{\check{a}_k}$ correspond with strong agreement between the intersection of the integer wavefronts as shown in FIGS. 14 to 17.

Unfortunately, there is no direct solution for finding the integer ambiguity candidate with the smallest (best) error norm. An ambiguity search should be conducted over the search space defined by the float solution according to:

$$\check{a}_{ILS} = \arg\min_{\check{a}_k \in Z^n} \{\Psi_{\check{a}_k}\} \quad (10)$$

The concepts behind the integer search are schematically illustrated in FIG. 18, which illustrates integer ambiguity combination quality measures in the integer search space for the two-dimensional example shown in FIG. 15. The intersection of wavefronts for satellites 1, 2, and 3 generate a series of spatial nodes, with each node representing a given integer ambiguity combination outcome, e.g. (0,0,0), (0,0,−1), (0,0,+1), ... (−2,−2,−2), etc. The quality, i.e. probability, of each node is represented via vertical arrows, with long arrows indicating high probability, and short arrows low probability. That is, the vertical arrow length is proportional to the probability assigned to the corresponding integer combination. In this example, the integer ambiguity combination candidate (0, 0, 0) has the highest probability, i.e. the smallest error norm, and it may therefore be considered the best integer ambiguity combination candidate. It may thus be selected as the ILS solution. Note that other integer ambiguity combination candidates such as (−1,−1,−2) and (+1,+1,+2) also have small error norms (high probability) in this example.

H.3.4 Validation of the Integer Solution

Figure 17:
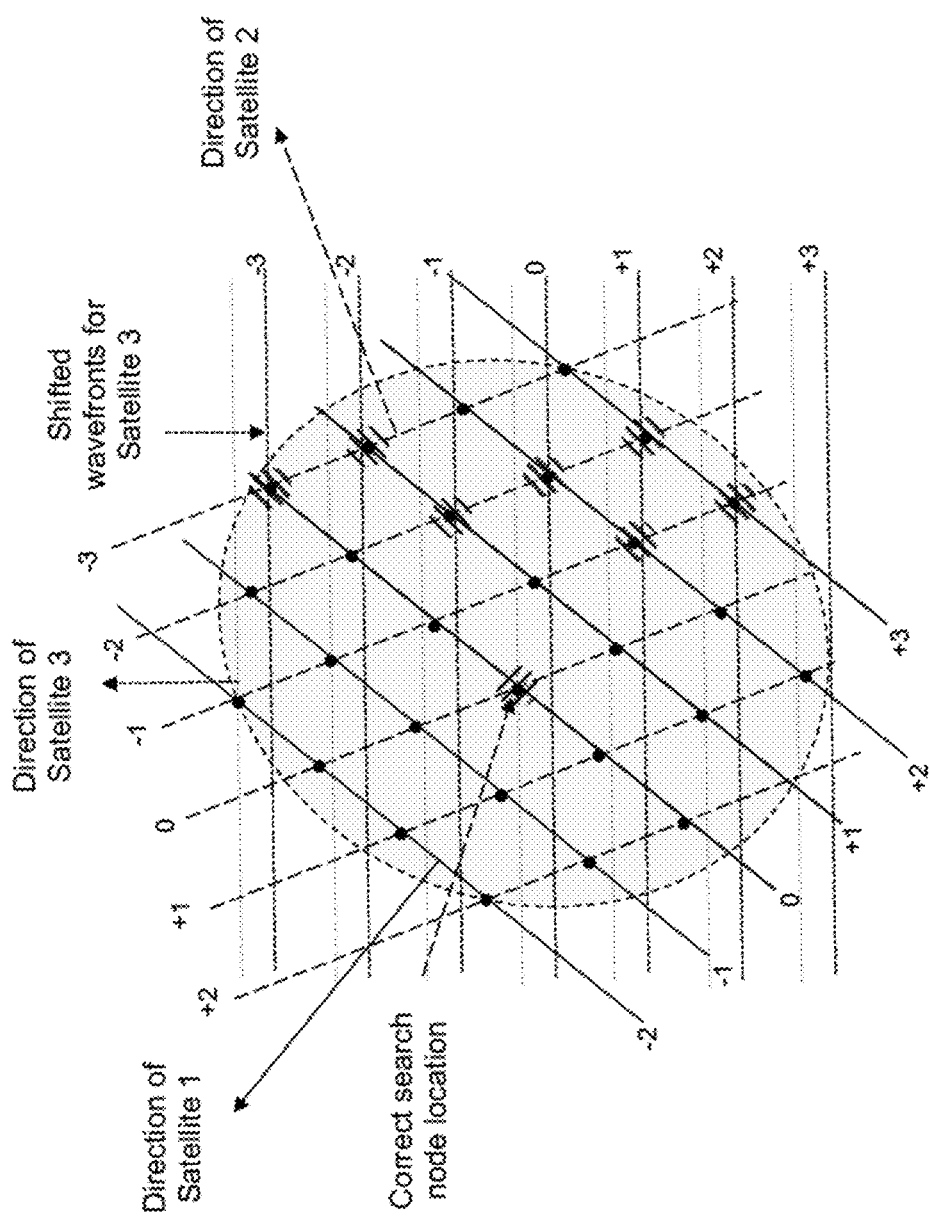
FIG. 17 schematically illustrates the potential impact of a bias on the ambiguity estimate of a satellite, i.e. satellite 3, to help understand the context in which some embodiments of the invention have been developed.

The availability of just two satellites in the two-dimensional ambiguity search problem (see FIG. 14) was insufficient to evaluate or identify the correct integer ambiguity combination. Even when a third satellite is added to the two-dimensional problem (FIG. 15), it may not be possible to reliably identify the correct integer ambiguity combination, especially when biases are present in the ambiguity estimates (FIG. 17).

The prevailing satellite geometry, the availability of multi-band carrier phase observations, and the quality of the underlying models affect the estimated integer solution. It is therefore advantageous to validate the integer solution before it is considered acceptable. The goal is to maximize the probability of successful (correct) fixing ($P_s$).

Historically, the ratio of the error norm $\Psi_{\check{a}_k}$ of the best and second best integer ambiguity candidates has been used to help decide if the best candidate is correct (see reference [11]), i.e.:

$$\text{If } \frac{\Psi_{\check{a}_{second}}}{\Psi_{\check{a}_{best}}} \begin{cases} \geq \gamma & \text{accept } \check{a}_{best} \quad \text{(Integer Solution)} \\ < \gamma & \text{accept } \hat{a} \quad \text{(Float Solution)} \end{cases} \quad (11)$$

where the constant γ is chosen empirically to balance integer fixing reliability and availability. The goal of the ratio test is to try to determine when the best integer ambiguity combination candidate is significantly better than all other integer ambiguity combination candidates. More specifically, the likelihood that the best candidate is correct is high when the probability mass function of the ambiguities is highly peaked, i.e. when the probability of the best candidate tends towards 1 and the probability of all other candidates tends towards 0.

Reference [23] shows that the ratio test lacks a sound theoretical basis and more rigorous validation techniques were proposed and termed "integer aperture estimation". No closed form expressions are available for computing the probability of successful fixing. Rather, extensive Monte Carlo simulation is needed to generate thresholds needed for resolution tests.

Closed-form expressions are however available for computing the success probability of simple integer ambiguity bootstrapping (see reference [18]). Integer ambiguity bootstrapping involves sequentially rounding each float ambiguity values, while incorporating the conditioned contribution of previously rounded ambiguities (see reference [8]). Again, under the assumption of normally distributed float-ambiguity estimates, the probability of correct integer ambiguity bootstrapping is given by:

$$P(\check{a}_B = a) = \prod_{i=1}^{n} \left\{ 2\Phi\left(\frac{1}{2\sigma_{\hat{a}_{i|I}}}\right) - 1 \right\} \quad (12)$$

with $\Phi(x)$ being the standard normal cumulative distribution function:

$$\Phi(x) = \frac{1}{\sqrt{2\pi}} \int_{-\infty}^{x} \exp\left(-\frac{x^2}{2}\right) dx,$$

$\sigma_{\hat{a}_{i|I}}$ is the i-th diagonal element of the float ambiguity covariance matrix, conditioned by all previously constrained integer parameters up to i.

The bootstrap probability provides a useful lower bound on the success rate of fixing. The bootstrap probability is dependent on the ordering of the ambiguity parameters and it may be computed after the ambiguity parameters are first transformed into a more orthogonal space—details of this process are provided below.

Note that the bootstrap probability is computed as the product of values and therefore tends to decrease as the number of ambiguities increases. This matches the concept described above in relation to FIGS. 14 to 18. That is, the likelihood that all wavefronts formed from each satellite intersect at a single search node tends to decrease as the number of satellites increases.

If the bootstrap probability is too low, then, conservatively, ambiguity fixing is unreliable. Because an increase in the number of ambiguities naturally decreases the bootstrap probability, this has prompted the idea of only fixing a subset of the estimated float ambiguities—termed partial fixing. Although partial fixing helps increase the yield of high precision results, there is an increased risk of incorrect ambiguity resolution as a result.

The bootstrap probability can also be computed for the case where a bias exists in one or more of the float ambiguities (see reference [19]):

$$P(\check{a}_B = a) = \prod_{i=1}^{n} \left\{ \Phi\left(\frac{1 - 2\Delta a}{2\sigma_{\hat{a}_{i|I}}}\right) + \Phi\left(\frac{1 + 2\Delta a}{2\sigma_{\hat{a}_{i|I}}}\right) - 1 \right\} \quad (13)$$

where $\Delta a$ is a vector containing bias values in each of the respective float ambiguities. The effect of ambiguity biases is to reduce the bootstrap probability. Even a relatively small bias on each ambiguity may significantly reduce the bootstrap probability when there are many satellites in view.

H.3.5 Float Solution Quality

The overall quality of the float solution can be determined using the ambiguity dilution of precision (ADOP), as described in reference [17]. The ADOP is defined using the determinant of the ambiguity covariance matrix as:

$$ADOP = \sqrt{\det Q_{\hat{a}}}^{\frac{1}{n}} \text{cycles} \quad (14)$$

The ADOP provides a measure of the average precision of all ambiguity values. Assuming the float solution has a Gaussian distribution, then the ADOP value can be used to compute an upper bound on the success rate of bootstrap ambiguity resolution as:

$$P(\check{a}_B = a) \leq \left\{ 2\Phi\left(\frac{1}{2ADOP}\right) - 1 \right\}^n \quad (15)$$

H.3.5 Fixed Integer Solution

Once the integer ambiguities are considered correct, they may be applied as constraints to the float solution, thus providing the following estimates of the remaining parameters:

$$\check{b} = \hat{b} - Q_{\hat{b}\hat{a}} Q_{\hat{a}}^{-1} (\hat{a} - \check{a}) \quad (16)$$

with $\check{b}$ denoting the non-ambiguity parameters computed from the integer-ambiguity constraints, and $Q_{\hat{a}}^{-1}$ denoting the matrix inverse of the ambiguity partition of the float solution covariance matrix.

The ambiguity parameters are correlated with all other parameters (i.e. $Q_{\hat{a}\hat{b}} \neq 0$) and therefore, if the ambiguities are constrained, there will be a corresponding improvement in the formal precision of the remaining parameters ($Q_{\check{b}} < Q_{\hat{b}}$):

$$Q_{\check{b}} = Q_{\hat{b}} - Q_{\hat{b}\hat{a}} Q_{\hat{a}}^{-1} Q_{\hat{b}\hat{a}}^T \quad (17)$$

The integer-constraint may be treated in two ways:
1. applied to the float solution after it is computed at each epoch;
2. by directly constraining the ambiguity parameters in the Kalman filter state vector.

In the case of option 1, there is no risk of corrupting the float solution if one or more integer ambiguities is wrong.

The advantage of option 2 is that fixed ambiguity parameters can be removed from the estimator state and thus help to reduce computational burden. A downside is that incorrect ambiguity resolution will tend to corrupt all future state estimates.

H.3.6 Solution Monitoring

There is in practice always a statistical probability that the selected integer ambiguities are incorrect. The float solution is not well determined. However, constraining the ambiguity parameters improves the solution redundancy. The variance of unit weight computed from the integer constrained float solution is therefore useful for validating the quality of the underlying float solution.

Methods are known for monitoring the quality of the estimated parameters, see for example reference [5] for least squares estimation, and reference [24] for Kalman filtering. A solution monitoring technique is advantageous to timely flag potential modelling errors in the estimated parameters.

H.3.7 Limitations of Hard-Integer Fixing

The approach to high-precision GNSS estimation presented so far is based on the assumption that there is only one correct integer value for each ambiguity parameter. This approach is here referred to as hard-integer fixing.

High-integrity applications demand low or very low probability of incorrect ambiguity resolution. That is, the probability of correct fixing should be high or very high. This means that hard-integer fixing will generally only occur when satellite geometry is strong, when GNSS measurements are clean and estimated float ambiguities are largely unbiased. In all, high-precision solution availability will be low and highly restricted, particularly in urban tracking environments.

H.4. Bayesian Approach to Integer Ambiguity Estimation

Using the integer nature of the ambiguity parameters without exclusively selecting a single integer combination is advantageous. Reference [9] first conceptualized the use of Bayesian estimation for GPS carrier phase positioning. The technique described in reference [9] used a bank of parallel Kalman filters to produce an optimal weighted combination of integer ambiguity candidates. Each filter is propagated forward in time until a single correct candidate emerged. Reference [6] further developed the theory of Bayesian estimation applied to GPS carrier phase data, whereby estimates of the parameters of interest are obtained by forming a weighted combination of results corresponding to all possible integer ambiguity outcomes. More recently, reference [20] framed a technique termed Best Integer Equivariant Estimation, which produces substantially the same result as reference [6], under the assumption of a Gaussian distribution of the float solution. Reference [4] also describes the use of a multiple-hypothesis test technique to isolate the correct integer ambiguity combination from a set of potential candidates.

A Bayesian approach to integer ambiguity estimation is also described in references [28] to [32]. See e.g. reference [28], p. 15, section 1 "Candidate set selection", disclosing a technique for efficiently selecting a number of candidates for the weighted average, i.e. for the weighted combination of integer ambiguity candidates, called "iFlex solution" in reference [28], p. 21, lines 26-33.

The idea of the Bayesian approach is to form the solution for location and scale based on a weighted combination of all integer ambiguity combinations. The Bayesian estimate (BE) of the ambiguities (see also reference [28], pp. 22-23) is given by:

$$\bar{a}_{BE} = \hat{a} + \Sigma_{\check{a}_k \in Z^n}(\hat{a} - \check{a}_k)\omega(\check{a}_k) \quad (18)$$

where $\bar{a}_{BE}$ is the Bayesian ambiguity estimate of the ambiguities (a), computed as the weighted average of all possible integer ambiguities $\check{a}_k$.

The respective weight $\omega(\check{a}_k)$ of each integer ambiguity candidate $(\check{a}_k)$ is given by:

$$\omega(\check{a}_k) = \frac{\exp\left\{-\frac{1}{2}(\hat{a}-\check{a}_k)^T Q_{\hat{a}}^{-1}(\hat{a}-\check{a}_k)\right\}}{\sum_{\check{a}_k \in Z^n} \exp\left\{-\frac{1}{2}(\hat{a}-\check{a}_k)^T Q_{\hat{a}}^{-1}(\hat{a}-\check{a}_k)\right\}} = \frac{\exp\left\{-\frac{\Psi_{\check{a}_k}}{2}\right\}}{\sum_{\check{a}_k \in Z^n} \exp\left\{-\frac{\Psi_{\check{a}_k}}{2}\right\}} \quad (19)$$

The weights given in equation (19) can also be interpreted as candidate probabilities. The term $(\hat{a}-\check{a}_k)^T Q_{\hat{a}}^{-1}(\hat{a}-\check{a}_k)$, inside the $\{\cdot\}$ in equation (19), is the distance the ambiguity candidate is from the float solution, as described in equation (9) above. Intuitively, each candidate is weighted by how well the candidate fits to the underlying float solution. Candidates that fit well are given large weight (high probability), whereas candidates that do not agree with the float solution are given low weight (low probability).

The formula for the weights in equation (19) assumes a Gaussian distribution for the float solution. However, the technique may be also be applied to any other suitable distribution such as the Student-T, Pearson-Type IV, Laplace, logistic, or empirical.

The Bayesian ambiguity estimates from equation (18) will, however, in general not be integer values. If the probability mass function of the ambiguity search space is highly peaked, the weighted average solution will be close to the best integer ambiguity combination candidate and the ambiguities will be close or very close to integers.

The $\bar{a}_{BE}$ solution sits between the float solution and a hard-fixed integer solution in terms of precision. This property makes the BE approach attractive for high-precision GNSS applications, since it enables an utmost precision to be delivered, even in situations where hard-integer fixing would be considered too unreliable (as illustrated by the curve labelled "correctly fixed ambiguity solution" in above FIG. 13).

In positioning applications, the carrier phase ambiguities are typically regarded as nuisance parameters. Thus, rather than estimating the Bayesian carrier phase estimates from equation (18), reference [6] suggests computing position via the following formulae:

$$\bar{b}_{BE}^{pos} = \hat{b}^{pos} + \Sigma_{\check{a}_k \in Z^n}\check{b}_k^{pos}\omega(\check{a}_k) \quad (20)$$

where $\hat{b}^{pos}$ is the vector of position states contained within the float solution vector:

$$\hat{b}^{pos} = H^{pos}\hat{b} = [\hat{x}, \hat{y}, \hat{z}]^T \quad (21)$$

with the coefficient matrix, $H^{pos}$ (3×p), constructed to extract the position states from the non-ambiguity float solution vector b:

$$H^{pos} = \begin{bmatrix} 1 & 0 & 0 & \cdots & 0 \\ 0 & 1 & 0 & \cdots & 0 \\ 0 & 0 & 1 & \cdots & 0 \end{bmatrix} \quad (22)$$

Note that the coefficient matrix H may also be constructed to extract specified parameters in $\hat{b}$, or any linear combination of parameters in $\hat{b}$.

$\check{b}^{pos}_k$ is the node position given with respect to the float position solution ($\hat{b}^{pos}$) corresponding to integer-ambiguity $(\check{a}_k)$ and is computed from:

$$\check{b}_k^{pos} = Q_{\hat{b}_{pos}\hat{a}} Q_{\hat{a}}^{-1}(\hat{a} - \check{a}_k) \quad (23)$$

with $Q_{\hat{b}_{pos}\hat{a}}$ (3×n) the partition of the float covariance matrix corresponding to the position/ambiguity parameters:

$$Q_{\hat{b}_{pos}\hat{a}} = H^{pos} Q_{\hat{b}\hat{a}} \quad (24)$$

The following formulae is used to compute the precision of the position estimates [6]:

$$Q_{\bar{b}_{BE}^{pos}} = [Q_{\hat{b}} - Q_{\hat{b}^{pos}\hat{a}} Q_{\hat{a}}^{-1} Q_{\hat{b}_{pos}\hat{a}}^T] + \Sigma_{\check{a}_k \in Z^n}\check{b}_k^{pos}\check{b}_k^{posT}\omega(\check{a}_k) - \Sigma_{\check{a}_k \in Z^n, \check{a}_j \in Z^n}\check{b}_k^{pos}\check{b}_j^{posT}\omega(\check{a}_k)\omega(\check{a}_j); k \neq j \quad (25)$$

H.4.1 Computational Aspects

The Bayesian estimates described in above equations (20) to (25) are based on a summation across all possible integer ambiguities ($\check{a}_k \in Z^n$). It is impractical to consider an infinite set of integer ambiguity combinations, especially for real-time processing. Fortunately, for a Gaussian distribution, the weight parameters $\omega(\check{a}_k)$ drop off exponentially, with an increase in the ambiguity error norm $(\hat{a}-\check{a}_k)^T Q_{\hat{a}}^{-1}(\hat{a}-\check{a}_k)$. Thus, only integer ambiguity combination candidates are considered for which the weights are significant (e.g. equal to or larger than $10^{-9}$). Given the best (smallest) error norm $\Psi_{\breve{a}_{best}} = (\hat{a} - \breve{a}_{best})^T Q_{\hat{a}}^{-1} (\hat{a} - \breve{a}_{best})$, the limit of the largest error norm that should be considered can be computed as follows.

The probability of the limiting candidate ($P_{limit}$) should be smaller than the probability of the best candidate ($P_{best}$) times a fraction of the integrity risk level ($\alpha$=e.g. $5.10^{-7}$), that is:

$$P_{limit} = \overleftarrow{\alpha} P_{best} \therefore \frac{P_{limit}}{P_{best}} = \overleftarrow{\alpha} \tag{26}$$

where $$\overleftarrow{\alpha} = \kappa \alpha \tag{27}$$

The parameter $\kappa$ is selected to ensure that the probability mass function of the ambiguity search space is sufficiently quantified such that the integrity risk is satisfied. The parameter $\kappa$ is a positive number in the range 0 to 1, preferably a value in the range between 0.01 and 0.1.

Using the formula for the candidate weights (probabilities) (equation (19)):

$$P_{limit} = \frac{\exp\left\{\frac{\Psi_{\breve{a}_{limit}}}{2}\right\}}{\sum_{\breve{a}_k \in Z^n} \exp\left\{\frac{\Psi_{\breve{a}_k}}{2}\right\}}; P_{best} = \frac{\exp\left\{\frac{\Psi_{\breve{a}_{best}}}{2}\right\}}{\sum_{\breve{a}_k \in Z^n} \exp\left\{\frac{\Psi_{\breve{a}_k}}{2}\right\}} \tag{28}$$

Using equation (28) in equation (26) yields:

$$\frac{P_{limit}}{P_{best}} = \frac{\exp\left\{\frac{\Psi_{\breve{a}_{limit}}}{2}\right\}}{\exp\left\{\frac{\Psi_{\breve{a}_{best}}}{2}\right\}} = \overleftarrow{\alpha}$$

$$\therefore \frac{P_{limit}}{P_{best}} = \exp\left\{\frac{\Psi_{\breve{a}_{best}}}{2} - \frac{\Psi_{\breve{a}_{limit}}}{2}\right\} = \overleftarrow{\alpha}$$

taking natural logarithms of both sides and simplifying:

$$\Psi_{\breve{a}_{limit}} = \Psi_{\breve{a}_{best}} - 2 \log_e(\overleftarrow{\alpha}) \tag{29}$$

Assuming an integrity risk $\alpha$=e.g. $5.10^{-1}$, and $\kappa$=0.1, then $\Psi_{\breve{a}}^{limit}$ will be equal to $\Psi_{\breve{a}_{best}}$+33.62. $\Psi_{\breve{a}_{limit}}$ is the limit of the largest error norm that should be considered, whereas $\Psi_{\breve{a}_{best}}$ is the error norm of the best integer ambiguity combination.

In practice, the weighed summation should be bounded to a finite number of search candidates depending on the computing power of the host device. If parallel computing facilities are available, many thousands of candidates may be considered at once. For real-time operation, 1000 candidates may be sufficient. There are situations where the search candidate limit is exceeded—i.e. the worst candidate in the search list has a probability that exceeds the integrity risk—in which case, the results are rejected.

One advantageous practical aspect of the technique is the ambiguity search. Even with just five satellites, with two frequency bands per satellite, there are ten carrier phase ambiguities to be considered. If each ambiguity has an uncertainty of just five cycles, then a brute-force ambiguity search may imply considering $5^{10}$ (i.e., approximately 9.7 million), an unwieldy number of combinations. Fortunately, the nature of GNSS carrier phase data leads to a particular structure in the float ambiguity covariance matrix that can be exploited in search algorithms.

A computationally efficient method for performing the integer ambiguity search is described in reference [16] and is termed the LAMBDA (least-squares ambiguity decorrelation adjustment) method. A part of the LAMBDA approach is to first transform the original real-valued (float) carrier phase ambiguities a, and their associated covariance matrix $Q_{\hat{a}}$, into a new, more orthogonal Z-domain:

$$\tilde{a} = Z^T \hat{a} \tag{30}$$

$$Q_{\tilde{a}} = Z^T Q_{\hat{a}} Z \tag{31}$$

The transformed ambiguities, denoted by $\tilde{a}$ in equation (30), have more uniform precisions compared with the original float ambiguities. Further, the resulting covariance matrix in equation (31) is more diagonal than the original float ambiguity covariance matrix.

In order to maintain the integer nature of the original carrier phase ambiguities, the Z-transform matrix can only contain integer entries. Without the constraint of integer entries in Z, it would be possible to fully decorrelate the ambiguities using well known orthogonalization techniques such as those described in reference [12] (see for example Chapter 5—*Orthogonalization and Least Squares*). Because of the integer restriction, the Z-transformation process generally only results in a partially decorrelated set of ambiguities.

Because the Z-transformed matrix $Q_{\tilde{a}}$ is more diagonal than the original float ambiguity covariance $Q_{\hat{a}}$, the number of integer ambiguities that should be searched generally becomes more or far more manageable.

It is assumed that all ambiguity searching and computations are accomplished after first transforming the ambiguities into the Z-domain. The Z-transform is invertible and therefore the ambiguities search in the Z-domain can be readily transformed back into their original domain.

H.4.2 Integer Ambiguity Search Process

The search process amounts to scanning through different integer ambiguity combinations and computing the error norm of each candidate. The error norm of each search candidate is given by:

$$\Psi_{\breve{a}_k} = (\hat{a} - \breve{a}_k)^T Q_{\hat{a}}^{-1} (\hat{a} - \breve{a}_k) \tag{9}$$

The inverse float ambiguity covariance matrix can be factored as:

$$Q_{\hat{a}}^{-1} = L_{\hat{a}} D_{\hat{a}} L_{\hat{a}}^T \tag{32}$$

where $L_{\hat{a}}$ is a (n×n) unit-lower-triangular matrix, and $D_{\hat{a}}$ is a (n×n) diagonal matrix.

Using equation (32) in equation (9) yields:

$$\Psi_{\breve{a}_k} = [(\hat{a} - \breve{a}_k)^T L_{\hat{a}}] D_{\hat{a}} [L_{\hat{a}}^T (\hat{a} - \breve{a}_k)] \tag{33}$$

In expanded form:

$$\Psi_{\breve{a}_k} = [\hat{a}(1) - \breve{a}_k(1), \quad \hat{a}(2) - \breve{a}_k(2), \quad \ldots \quad \hat{a}(n) - \breve{a}_k(n)] * \tag{34}$$

$$\begin{bmatrix} 1 & 0 & \ldots & 0 \\ l_{21} & 1 & \ldots & 0 \\ \ldots & \ldots & \ldots & \ldots \\ l_{n1} & l_{n2} & \ldots & 1 \end{bmatrix} \begin{bmatrix} d_1 & 0 & \ldots & 0 \\ 0 & d_2 & \ldots & 0 \\ \ldots & \ldots & \ldots & \ldots \\ 0 & 0 & \ldots & d_n \end{bmatrix} \begin{bmatrix} 1 & l_{21} & \ldots & l_{n1} \\ 0 & 1 & \ldots & l_{n2} \\ \ldots & \ldots & \ldots & \ldots \\ 0 & 0 & \ldots & 1 \end{bmatrix}$$

$$\begin{bmatrix} \hat{a}(1) - \breve{a}_k(1) \\ \hat{a}(2) - \breve{a}_k(2) \\ \ldots \\ \hat{a}(n) - \breve{a}_k(n) \end{bmatrix}$$

By combining the first two and last two terms in the right-hand side of equation (34) yields:

$$\Psi_{\check{a}_k} = [\psi(1),\ \psi(2),\ \dots\ \psi(n)] \begin{bmatrix} d_1 & 0 & \dots & 0 \\ 0 & d_2 & \dots & 0 \\ \dots & \dots & \dots & \dots \\ 0 & 0 & \dots & d_n \end{bmatrix} \begin{bmatrix} \psi(1) \\ \psi(2) \\ \dots \\ \psi(n) \end{bmatrix} \quad (35)$$

with $[\psi(1),\ \psi(2),\ \dots\ \psi(n)] =$ (36)

$$[\hat{a}(1)-\check{a}_k(1),\ \hat{a}(2)-\check{a}_k(2),\ \dots\ \hat{a}(n)-\check{a}_k(n)] * \begin{bmatrix} 1 & 0 & \dots & 0 \\ l_{21} & 1 & \dots & 0 \\ \dots & \dots & \dots & \dots \\ l_{n1} & l_{n2} & \dots & 1 \end{bmatrix}$$

The summation of $\Psi_{\check{a}_k}$ can be written as:

$$\Psi_{\check{a}_k} = \psi(1)^2 d_1 + \psi(2)^2 d_2 + \psi(3)^2 d_3 + \dots + \psi(n)^2 d_n \quad (37)$$

Given the triangular nature of $L_{\hat{a}}$, and symmetry of the inner-scalar product (33), the error norm $\Psi_{\check{a}_k}$ can be computed by sequentially starting at the last ambiguity index (n), incrementing to the first index (1). All terms in equation (37) are positive values since they are the product of a positive diagonal element $d_i$, and a squared number $\psi(i)$. Therefore, the value of $\Psi_{\check{a}_k}$ increases as each ambiguity parameter is considered in the formation of the error norm.

Figure 19:
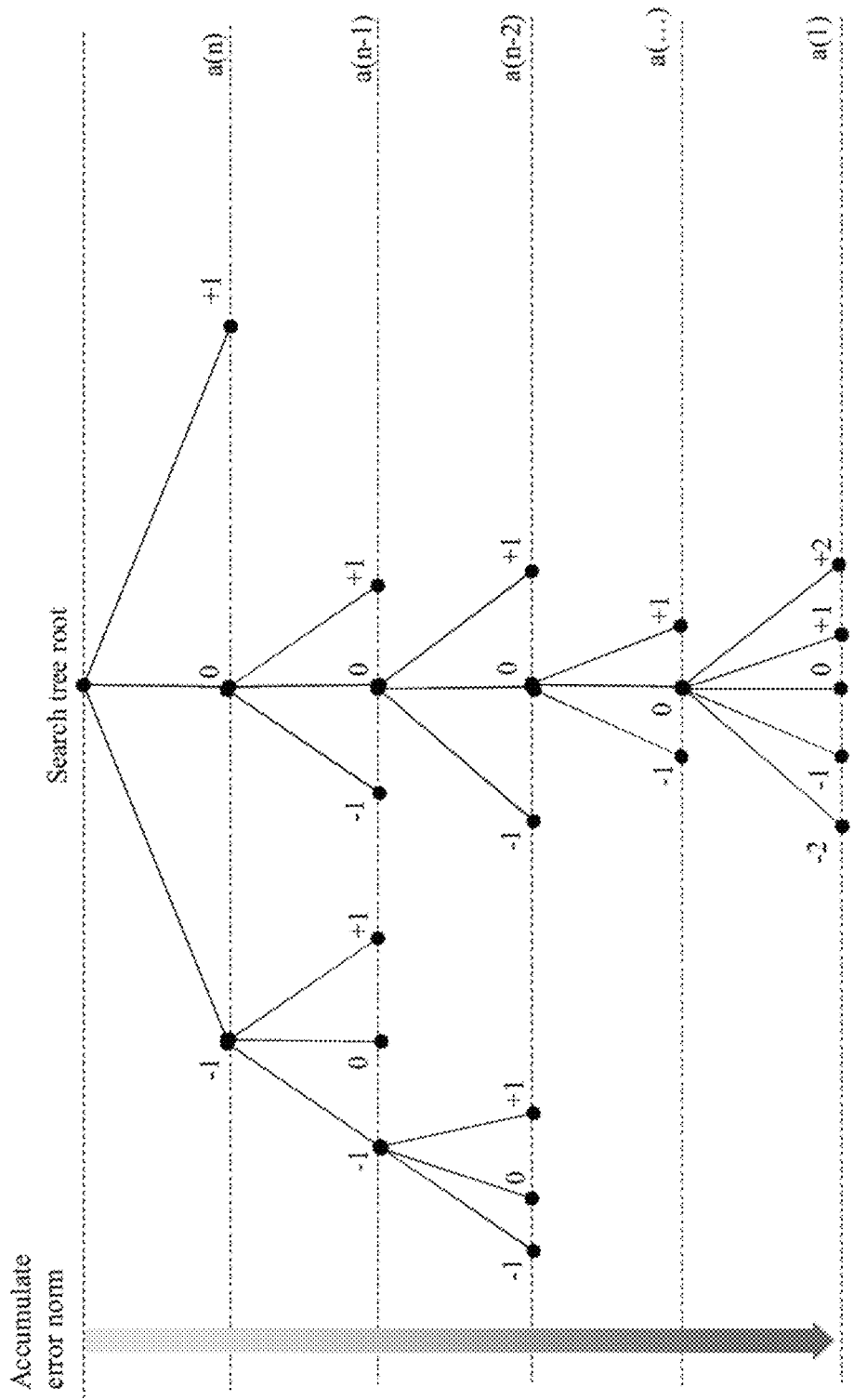
FIG. 19 schematically illustrates the process of searching a tree of integer ambiguities to select candidate sets, to help understand the background and context in which some embodiments of the invention have been developed.

The search process may be schematically illustrated by a search tree as in FIG. 19. Approximate integer values of each ambiguity are determined before the integer search is started. Simple nearest-integer rounding of the float ambiguity values may provide a suitable starting point. The integer search is then computed relative to the approximate integer solution, i.e. integer search values represent offsets relative to the rounded float ambiguities.

The integer search commences at the root of the search tree, with the candidate error norm initialized to zero. The ambiguity parameter a(n) is considered and the error norm accumulated based on equations (33) to (37). The search is conducted with ambiguity offsets incrementing away from zero, i.e.:

[0,+1,−1,+2,−2,+3,−3, . . . ]

with the integer ambiguity value a(n) set, the next ambiguity parameter a(n−1) is considered. The ambiguity value tested first is a(n−1)=0. The error norm is incremented based on the contribution from a(n−1). This process of moving down the search tree and accumulating the error norm continues until finally reaching ambiguity a(1). The error norm $\Psi_{\check{a}_k}$, generated at the completion of the first complete integer ambiguity candidate (0, 0, 0, . . . , 0), represents the smallest norm value of the search so far.

The search progresses by moving back up the search tree and considering the next branch involving the integer value for a(1)=+1. This represents the second complete integer ambiguity candidate (+1, 0, 0, . . . 0). The error norm for this candidate is given by the value accumulated down to ambiguity a(2), plus the additional contribution for a(1)=+1.

The error norm for candidate (+1, 0, 0, . . . , 0) may be either larger or smaller than that obtained for candidate (0, 0, 0, . . . 0). If a search is being conducted for the smallest error norm (the best candidate), then the smallest error norm can be updated accordingly. Many branches of the search tree can be pruned by using the current smallest error norm value. For example, if the next search candidate (−1, 0, 0, . . . 0) has a norm greater than the smallest, then candidate (−2, 0, 0, . . . 0) will have an even larger norm value, hence it makes sense to prune all branches to the left. Likewise, for branches to the right.

Once all branches of ambiguity a(1) are exhausted, the search moves back up the search tree to consider branches of a(2). If any left/right branch produces an error norm greater than the current minimum value, it is pruned.

The search for the smallest error norm is generally fast or very fast because of the ability to prune the search tree. A more general problem involves finding the best d search candidates (d being introduced above with reference to FIG. 8), or finding all candidates that have error norm values smaller than a specified value. A search list of d ordered candidates can be maintained with the worst candidate error norm being used as the target for pruning branches of the search tree.

Let us now describe further embodiments of the invention.

Figure 20:
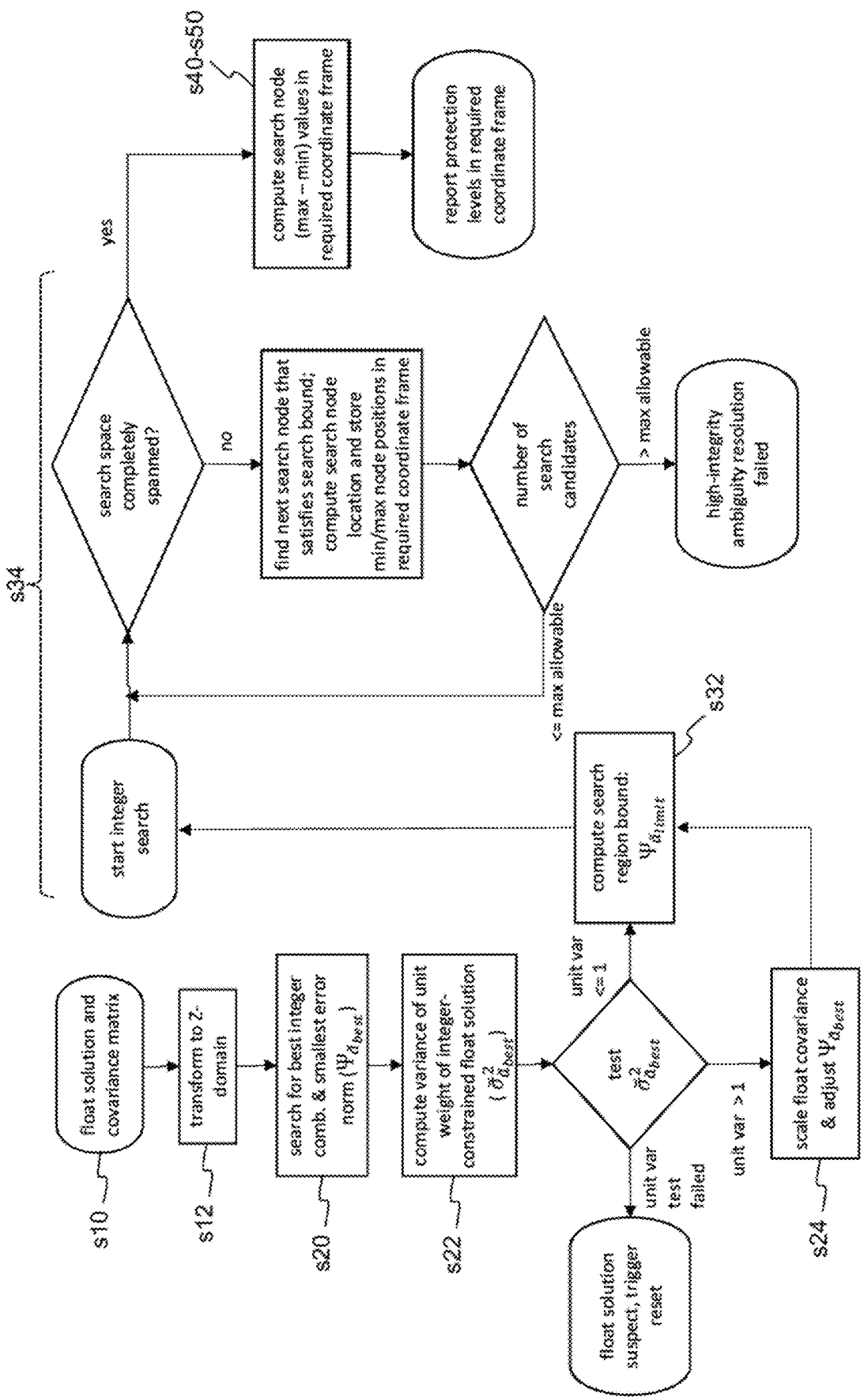
FIG. 20 is a flowchart of a method in one embodiment of the invention.

FIG. 20 is a flowchart of a protection level generation method in one embodiment of the invention. The method may comprise following steps 1 to 12:

Step 1: Compute float solution and associated covariance matrix:

$$\begin{bmatrix} \hat{a} \\ \hat{b} \end{bmatrix}; \begin{bmatrix} Q_{\hat{a}} & Q_{\hat{a}\hat{b}} \\ Q_{\hat{b}\hat{a}} & Q_{\hat{b}} \end{bmatrix} \quad (4)$$

Step 2: Transform the float ambiguities and their associated covariance matrix into the Z-domain according to the procedure described by equations (30) to (31):

$$\tilde{a} = Z^T \hat{a} \quad (30)$$

$$Q_{\tilde{a}} = Z^T Q_{\hat{a}} Z \quad (31)$$

Step 3: It is advisable to ensure that ambiguities have sufficiently converged, i.e. the ADOP is acceptable. A suitable test for convergence is:

$$P_{ADOP} = \left\{ 2\Phi\left(\frac{1}{2ADOP}\right) - 1 \right\}^n > (1-\alpha)$$

This test for convergence is not particularly restrictive in terms of limiting the availability of high-precision solutions since it specifies an upper limit and it is larger than the bootstrap probability (see reference [22]).

Step 4: An integer search is conducted for the "best integer ambiguity combination", using the Z-transformed float ambiguities and their associated covariance matrix. The best integer ambiguity combination (in the Z-domain) is the one that minimizes the error norm:

$$\Psi_{\check{a}_{best}} = (\tilde{a} - \check{a}_{best})^T Q_{\tilde{a}}^{-1} (\tilde{a} - \check{a}_{best}) \quad (38)$$

The search for the smallest error norm is relatively efficient, since many branches of the search tree can be pruned early in the search process, thus reducing the total number of search nodes to be spanned. See above section H.4.2.

Step 5: Compute the variance of unit weight for the best integer constrained float solution:

$$\check{\sigma}^2_{\check{a}_{best}} = \frac{\Psi_{\check{a}_{best}}}{n} \quad (39)$$

Use hypothesis test to see if $\check{\sigma}^2_{\check{a}_{best}}$ is significantly greater than 1. If so, consider resetting the underlying float filter because of assumed model failure. Otherwise, if $\check{\sigma}^2_{\check{a}_{best}} > 1$, upscale the float solution covariance matrix, and adjust $\Psi_{\check{a}_{best}} = n$.

Step 6: The search region bound is according to equation (20):

$$\Psi_{\check{a}_{limit}} = \Psi_{\check{a}_{best}} - 2\log_e(\tilde{\alpha}) \qquad (40)$$

Step 7: An integer ambiguity search is undertaken using the Z-transformed ambiguities, to find a list of the candidates with the smallest error norms that satisfy condition (41):

$$\check{a}_j \in Z^n | \Psi_{\check{a}_j} < \Psi_{\check{a}_{limit}} \qquad (41)$$

If the integer ambiguity probability mass function is too flat, then it is possible that the number of search candidates exceeds a preset maximum (D). In this case, the solution is deemed unsatisfactory.

Step 8: Using the result of equation (23), and the inverse Z-transform derived from equation (30), each integer ambiguity combination candidate is used to compute corresponding estimates of the search node position relative to the float position ($\vec{b}_j^{pos}$):

$$\vec{b}_j^{pos} = -Q_{\hat{b}^{pos}\hat{a}} Q_{\hat{a}}^{-1} Z^{-T}(\tilde{a} - \check{a}_j) \qquad (42)$$

Step 9: Often position parameters are estimated in terms of earth-centered, earth-fixed Cartesian coordinates (X, Y, Z) for GNSS applications. The search node positions should be provided in a local horizon (east, north, up) frame defined, for example, at the NSS receiver location, therefore a suitable coordinate transformation is applied to equation (42) according to:

$$\vec{b'}_j^{pos} = M \vec{b}_j^{pos} \qquad (43)$$

with Jacobian matrix M, given by:

$$M = \begin{bmatrix} -\sin(lon) & \cos(lon) & 0 \\ -\sin(lat)\cos(lon) & -\sin(lat)\sin(lon) & \cos(lat) \\ \cos(lat)\cos(lon) & \cos(lat)\sin(lon) & \sin(lat) \end{bmatrix} \qquad (44)$$

where lat and lon are the geographic latitude and longitude respectively, corresponding to the user position (X,Y,Z).

Let the east, north, up, coordinate components of $\vec{b'}_j^{pos}$, be $\vec{E}_j$, $\vec{N}_j$, $\vec{U}_j$, respectively.

Step 10: The ambiguity search protection levels may be computed from the range of the horizontal and vertical search node locations, as follows:

$$\text{horizontal protection level} = \max_j \sqrt{\vec{E}_j^2 + \vec{N}_j^2} - \min_j \sqrt{\vec{E}_j^2 + \vec{N}_j^2} \qquad (45)$$

$$\text{vertical protection level} = \max_j \vec{U}_j - \min_j \vec{U}_j \qquad (46)$$

The protection levels may be alternatively presented in terms of along-track, cross-track, up, as may be advantageous for automotive applications.

Step 11: The reported position of the NSS receiver is given by the weighted mean of the top (d) search candidates according to:

$$\vec{b}_{BE}^{pos} = \hat{b}^{pos} + \Sigma_{\check{a}_k \in Z^n} \vec{b}_k^{pos} \omega(\check{a}_k) \qquad (20)$$

Step 12: The 1-sigma precision of the NSS receiver position is given by:

$$Q_{\vec{b}_{BE}^{pos}} = [Q_{\hat{b}} - Q_{\hat{b}^{pos}\hat{a}} Q_{\hat{a}}^{-1} Q_{\hat{b}^{pos}\hat{a}}^T] + \Sigma_{\check{a}_k \in Z^n} \vec{b}_k^{pos} \vec{b}_k^{posT} \omega(\check{a}_k) - \Sigma_{\check{a}_k \in Z^n, \check{a}_j \in Z^n} \vec{b}_k^{pos} \vec{b}_j^{posT} \omega(\check{a}_k) \omega(\check{a}_j); k \neq j \qquad (25)$$

Figure 21:
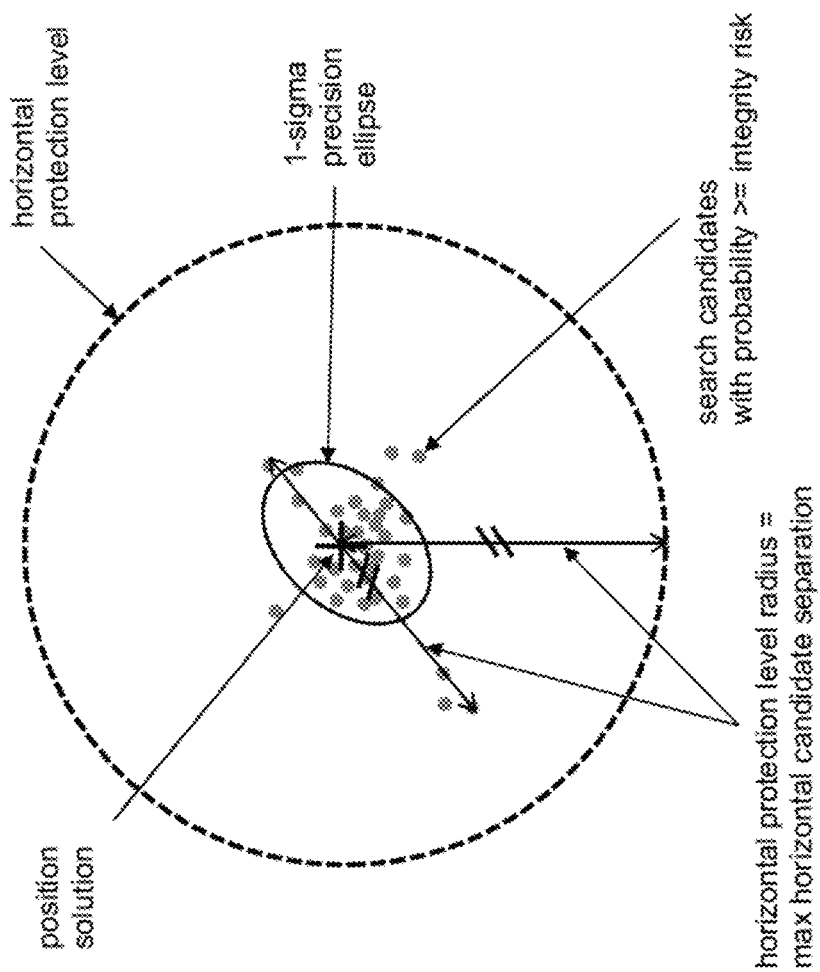
FIG. 21 is a schematic plan view of estimated position solution and illustration of horizontal protection level derived from the measure of spread of integer ambiguity candidates, in one embodiment of the invention.
Figure 22:
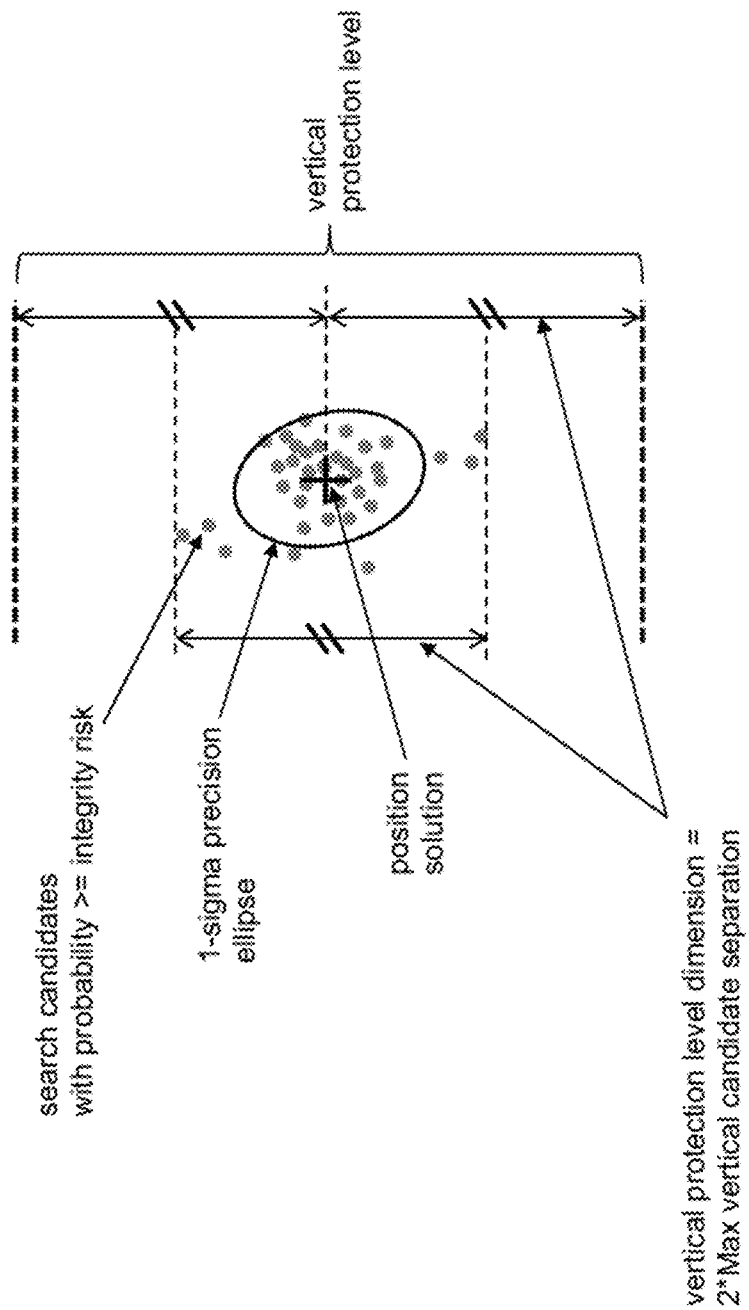
FIG. 22 is a schematic side elevation view of position solution and vertical protection level derived from the measure of spread of integer ambiguity candidates, in one embodiment of the invention.

FIGS. 21 and 22 schematically illustrate how the horizontal and vertical protection levels are derived from the measure of spread of the integer ambiguity combination candidates.

FIG. 21 shows a plan view of the estimated NSS receiver position and illustrates the horizontal protection level being derived from the spread of integer ambiguity candidates. Each integer search candidate is depicted with a dot, and the weighted average of the integer search candidates is shown as a black cross. The horizontal protection level radius is computed as the largest horizontal distance between all integer search candidates considered. The 1-sigma precision of the position estimate is illustrated with an ellipse centered on the estimated NSS receiver position solution.

FIG. 22 shows a side elevation of the estimated NSS receiver position and illustrates the vertical protection level being derived from the spread of integer ambiguity candidates. The vertical protection level is given by twice the vertical spread of the integer search candidates.

The protection level generation method described with reference to FIG. 20 is advantageous notably for the following reasons. If the float ambiguities are unbiased and consistent with their covariance matrix, the correct integer ambiguity combination candidate will also have the smallest error norm. Candidates with larger error norms will be spread around the best integer ambiguity combination candidate in this case. Unfortunately, in practice, the float ambiguities may be biased and therefore the best integer ambiguity combination candidate may not be correct. For example, in FIG. 21, assume that the correct integer ambiguity combination candidate is the one located at the lower left. All other integer ambiguity combination candidates, including the one with the smallest error norm, are located above and right of the correct integer ambiguity combination candidate. Even in this situation with a significant bias, the horizontal protection level still bounds the correct position. The protection level generation method described with reference to FIG. 20 is generally resilient to biases in the float ambiguity solution and yields a conservative measure of the uncertainty of the carrier phase ambiguities.

References [28] to [32] cover some practical aspects of using Bayesian estimation applied to integer carrier ambiguity constrained GNSS applications. The protection level generation method described with reference to FIG. 20 may be regarded, to a certain extent, as building on some of the concepts described in references [28] to [32] in order to address high-integrity applications. This is notably done, in some embodiments, by using a measure of spread of the integer ambiguity candidates to determine protection levels for a specified integrity risk.

The protection level generation method described with reference to FIG. 20 is relatively robust against biases in the float solution. This is notably because the protection levels are generated from the entire spread of integer ambiguity candidates that meet the search space requirement. The protection levels are for example not generated on the assumption that the distribution of the search candidates is centered on the correct candidate.

FIG. 10 schematically illustrates a system 100 in one embodiment of the invention. System 100 comprises an NSS receiver and/or a processing entity capable of receiving data from the NSS receiver. The system operates to estimate, or processes a prior estimation of, parameters derived from NSS signals useful to determine a position, and to generate one or more protection levels for an application relying on NSS observations to produce an estimate of said parameters or a combination thereof. As mentioned above, a protection level is a statistical error bound ensuring that the estimate only exceeds the protection level with a probability, i.e. the integrity risk. System 100 comprises: a float solution computing unit 110, a best integer ambiguity combination search and identification unit 120, an additional integer ambiguity combinations identification unit 130, a spread measure computing unit 140, and a protection level generating unit 150. Float solution computing unit 110 is configured for computing a float solution using NSS signals observed by the NSS receiver. Best integer ambiguity combination search and identification unit 120 is configured for searching for, based on the float solution, and identifying an integer ambiguity combination that minimizes an error norm, the identified integer ambiguity combination being here referred to as "best integer ambiguity combination". Additional integer ambiguity combinations identification unit 130 is configured for identifying, among a set of other integer ambiguity combinations determined based on the float solution, those integer ambiguity combinations, here referred to as "additional integer ambiguity combinations", having the smallest error norms that, together with the error norm of the best integer ambiguity combination, jointly satisfy the integrity risk. Spread measure computing unit 140 is configured for computing a measure of spread of at least one of: (i) the best integer ambiguity combination and additional integer ambiguity combinations, and (ii) values of a parameter or of parameters derivable from the best integer ambiguity combination and additional ambiguity combinations. Protection level generating unit 150 is configured for generating the at least one protection level based on the computed measure of spread.

In one embodiment, a vehicle comprises a system 100 as described above. The vehicle may for example be an autonomous vehicle such as a self-driving vehicle, a driverless vehicle, a robotic vehicle, a highly-automated vehicle, or a partially-automated. The vehicle may for example be a car, a truck, a bus, a motorcycle, a tractor, a combine harvester, a crop sprayer, a construction equipment, or a train. Exemplary applications may include machine guidance, construction work, operation of unmanned aerial vehicles (UAV), also known as drones, and operation of unmanned surface vehicles/vessels (USV).

Additional Remarks

Any of the above-described methods and their embodiments may be implemented, at least partially, by means of a computer program. The computer program may be loaded on an apparatus, such as for example an NSS receiver (running on a rover station, on a reference station, or within a vehicle) or a server (which may comprise one or a plurality of computers). Therefore, the invention also relates, in some embodiments, to a computer program, which, when carried out on an apparatus as described above, such as for example an NSS receiver (running on a rover station, on a reference station, or within a vehicle) or a server, carries out any one of the above-described methods and their embodiments.

The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, an SSD, a CD ROM, a DVD, a CD, a flash memory unit, or the like, wherein the computer program is permanently or temporarily stored. The invention also relates, in some embodiments, to a computer-readable medium (or to a computer-program product) having computer-executable instructions for carrying out any one of the methods of the invention.

The invention also relates, in some embodiments, to a firmware update adapted to be installed on receivers already in the field, i.e. a computer program which is delivered to the field as a computer program product. This applies to each of the above-described methods and apparatuses.

NSS receivers may include an antenna, configured to receive the signals at the frequencies broadcasted by the satellites, processor units, one or more accurate clocks (such as crystal oscillators), one or more central processing units (CPU), one or more memory units (RAM, ROM, flash memory, or the like), and a display for displaying position information to a user.

Where the terms "a float solution computing unit", "best integer ambiguity combination search and identification unit", "additional integer ambiguity combinations identification unit", "spread measure computing unit", "protection level generating unit", and the like are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Further, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding and are not intended to limit the scope of the invention. The scope of the invention is much rather defined by the appended claims.

ABBREVIATIONS

ADOP ambiguity dilution of precision
AL alert limit
ARAIM advanced RAIM
BDS BeiDou Navigation Satellite System
BE Bayesian estimate
EGNOS European Geostationary Navigation Overlay Service
EW East-West
GNSS global navigation satellite system
GDOP geometric dilution of precision
GPS Global Positioning System
HPL horizontal protection level
ILS Integer least squares
IRNSS Indian Regional Navigation Satellite System
LAMBDA least-squares ambiguity decorrelation adjustment
MSAS Multi-functional Satellite Augmentation System
NAVIC NAVigation with Indian Constellation
NS North-South
NSS navigation satellite system
PPP precise point positioning
PRN pseudo-random number
QZSS Quasi-Zenith Satellite System
RAIM receiver autonomous integrity monitoring
RAM random-access memory
RNSS regional navigation satellite system
ROM read-only memory
RTK real-time kinematic
SBAS satellite-based augmentation system
SSD solid-state drive
VPL vertical protection level
WAAS Wide Area Augmentation System

REFERENCES

[1] Hofmann-Wellenhof B., et al., *GNSS, Global Navigation Satellite Systems, GPS, GLONASS, Galileo, & more*, Springer-Verlag Wien, 2008.

[2] Wu, S. et. al. 2008. *Geometry Extra-Redundant Almost Fixed Solutions: A High Integrity Approach for Carrier Phase Ambiguity Resolution for High Accuracy Relative Navigation*, Position, Location and Navigation Symposium, 2008, Monterey, Calif., 3 September. IEEE/ION.

[3] Khanafseh, S. & Pervan, B. 2010, *A New Approach for Calculating Position Domain Integrity Risk for Cycle Resolution in Carrier Phase Navigation Systems*, IEEE Transactions on Aerospace and Electronic Systems, Vol. 46, No. 1, January, pp. 296-307.

[4] Abdel-Hafez, M. F., et. al. 2003. *A High-Integrity and Efficient GPS Integer Ambiguity Resolution Method*, Navigation, Vol 50, No 4, Winter 2003-2004.

[5] Baarda, W. 1968. *A testing procedure for use in geodetic networks*. Netherlands Geodetic Commission, Publication on Geodesy, New Series, Vol 2(5), Delft.

[6] Betti B, Crespi M, Sanso F, 1993. *A geometric illustration of ambiguity resolution in GPS theory and a Bayesian approach*, Manuscripta Geodaetica, Vol 18, pp. 317-330.

[7] Blanch, J. A. et. al. 2011. *A proposal for multi-constellation advanced RAIM for vertical guidance*. In Proceedings of the 24$^{th}$ International Technical Meeting of the Satellite Division (ION-GNSS-2011).

[8] Blewitt, G, 1989. *Carrier-phase ambiguity resolution for the Global Positioning System applied to geodetic baselines up to 2000 km*. Journal of Geophysical Research 94 (B8): 10.187-10.302.

[9] Brown, R. G. and Hwang, P. Y. C. 1983. *A Kalman Filter Approach to Precision GPS Geodesy*, GPS collated articles, Vol II, US Institute of Navigation.

[10] Brown, R. G. 1992. *A baseline GPS RAIM scheme and a note on the equivalence of three RAIM methods*. Navigation, Vol 39. No. 3, pp. 143-165.

[11] Euler, H. J. & Schaffrin, B. 1990. *On a measure of the discernibility between difference ambiguity solutions in the static-kinematic GPS-mode*, Proc. IAG Symposium No 107, Kinematic Systems in Geodesy, Surveying and Remote Sensing, K. P. Schwarz and G. Lachapelle (Eds.), Banff, Canada, pp. 285-295.

[12] Golub, G. H. & Van Loan, C. F. 1996. *Matrix Computations, 3$^{rd}$ Ed*, John Hopkins Press, Maryland, ISBN: 0-8018-5413-X.

[13] Khanafseh, S. et. al. 2012, *Integrity risk of cycle resolution in the presence of bounded faults*, Proceedings of the 2012 IEEE/ION Position Location and Navigation Symposium, 23 April, Monterey, Calif.

[14] Talbot, N. C. 1993. *Centimeters in the Field, a User's Perspective of Real-time Kinematic Positioning in a Production Environment*, Proceedings of the 6th International Technical Meeting of the Satellite Division of the Institute of Navigation, ION-GPS-93, Salt Lake City, Utah, 22-24 September, pp. 1049-1057.

[15] Teunissen, P. J. G. 1990. *Quality Control in Integrated Navigation Systems*, IEEE Aerospace and Electronic Systems Magazine, August.

[16] Teunissen, P. J. G. 1993. *Least Squares Estimation of the Integer GPS Ambiguities*, Delft Geodetic Computing Center (LGR) 16p. Invited Lecture, Section IV Theory and Methodology. IAG General Meeting, Beijing, China, August.

[17] Teunissen, P. J. G. 1997. *Ambiguity Dilution of Precision: Definition, Properties and Application*, Proceeding of the 10$^{th}$ International Technical Meeting of the Satellite Division of the Institute of Navigation (ION-GPS-97), September 16-19, Kansas City, Mo.

[18] Teunissen, P. J. G. 1998. *Success probability of integer GPS ambiguity rounding and bootstrapping*, Journal of Geodesy, 72: 606-612.

[19] Teunissen, P. J. G. 2000. *Bias Robustness of GPS Ambiguity Resolution*, ION-GPS-2000, September 19-22, Salt Lake City, Utah, pp. 104-112.

[20] Teunissen, P. J. G. 2002. *A New Class of GNSS Ambiguity Estimators*, Artificial Satellites, Vol 37, No 4.

[21] Teunissen, P. J. G. 2003. *Towards a unified theory of GNSS ambiguity resolution*, Journal of Global Positioning Systems, Vol 2, No 1, pp 1-12.

[22] Teunissen, P. J. G. 2003a. *An invariant upper bound for the GNSS boostrapped ambiguity success-rate*, Journal of Global Positioning Systems, Vol. 2, No. 1: 13-17.

[23] Teunissen, P. J. G. 2013. *GNSS Integer Ambiguity Validation: Overview of Theory and Methods*, Proceedings of the Institute of Navigation Pacific PNT 2013, Honolulu, Hi., April 23-25.

[24] Teunissen, P. J. G. and Salzmann, M. A. 1989. *A recursive slippage test for use in state-space filtering*, Manuscripta Geodaetica, 14:383-390.

[25] Vollath, U. 2004. *The Factorized Multi-Carrier Ambiguity Resolution (FAMCAR) Approach for Efficient Carrier-Phase Ambiguity Estimation*, Proceedings of the 17th International Technical Meeting of the Satellite Division of the Institute of Navigation (ION-GNSS 2004), Long Beach, Calif., September 21-14, pp. 2499-2508.

[26] Walter, T. et. al. 2003. *Integrity Lessons from the WAAS Integrity Performance Panel (WIPP)*, Proceedings of the National Technical Meeting of the Institute of Navigation, Anaheim, Calif., January, pp. 183-194.

[27] Zhu, Ni, et. al. 2018. *GNSS Position Integrity in Urban Environments: A Review of Literature*, IEEE Transactions on Intelligent Transportation Systems, Vol 19, No 9.

[28] WO 2010/021660 A2 entitled "GNSS signal processing methods and apparatus with candidate set selection" (Trimble ref.: A2339)

[29] WO 2010/021657 A2 entitled "GNSS signal processing methods and apparatus with scaling of quality measure" (Trimble ref.: A2523)

[30] WO 2010/021659 A2 entitled "GNSS signal processing methods and apparatus with ambiguity convergence indication" (Trimble ref.: A2524)

[31] WO 2010/021658 A2 entitled "GNSS signal processing methods and apparatus with tracking interruption" (Trimble ref.: A2525)

[32] WO 2010/021656 A2 entitled "GNSS signal processing methods and apparatus with ambiguity selection" (Trimble ref.: A2526)

[33] EP 3 035 080 A1 entitled "Navigation satellite system positioning involving the generation of correction information" (Trimble ref.: A4396)

[34] EP 3 130 943 A1 entitled "Navigation satellite system positioning involving the generation of tropospheric correction information" (Trimble ref.: 15072-EPO)

The invention claimed is:

1. Method, carried out by at least one of a navigation satellite system receiver, hereinafter abbreviated as "NSS receiver", and a processing entity capable of receiving data from the NSS receiver, for estimating, or processing a prior estimation of, parameters derived from NSS signals useful to determine a position, and for generating at least one protection level for an application relying on NSS observations to produce an estimate of said parameters or a combination thereof, wherein a protection level is a statistical error bound ensuring that the estimate only exceeds the protection level with a probability, hereinafter referred to as an "integrity risk", the method comprising:

computing a float solution using NSS signals observed by the NSS receiver;

searching for, based on the float solution, and identifying an integer ambiguity combination that minimizes an error norm, the identified integer ambiguity combination being hereinafter referred to as "best integer ambiguity combination";

identifying, among a set of other integer ambiguity combinations determined based on the float solution, those integer ambiguity combinations, hereinafter referred to as "additional integer ambiguity combinations", having the smallest error norms that, together with the error norm of the best integer ambiguity combination, jointly satisfy the integrity risk;

computing a measure of spread of at least one of:
(i) the best integer ambiguity combination and the additional integer ambiguity combinations, and
(ii) values of a parameter or of parameters derivable from the best integer ambiguity combination and the additional ambiguity combinations; and generating the at least one protection level based on the computed measure of spread.

2. Method of claim 1, wherein an alert limit is associated with each protection level, the alert limit being a maximum allowable uncertainty in the estimate that is considered acceptable for the application, the method further comprising:

determining whether any of the at least one protection level exceeds its respective alert limit; and if so, refraining from using the estimate, or part of the estimate, for the application.

3. Method of claim 1, wherein the integrity risk is a number set according to an integrity requirement of the application.

4. Method according to claim 1, wherein the integrity risk is a number equal to or smaller than $10^{-3}$ per NSS receiver epoch, preferably a number comprised between $10^{-5}$ and $10^{-9}$ per NSS receiver epoch, and more preferably a number comprised between $10^{-7}$ and $10^{-9}$ per NSS receiver epoch.

5. Method according to claim 1, further comprising, between, first, computing the float solution and, second, searching for and identifying the best integer ambiguity combination:

transforming the float solution into a more orthogonal space through a decorrelation technique.

6. Method according to claim 1, further comprising, between, first, computing the float solution and, second, searching for and identifying the best integer ambiguity combination:

determining that ambiguities of the float solution have sufficiently converged.

7. Method according to claim 1, wherein the error norm of an integer ambiguity combination represents a distance from the integer ambiguity combination to the float solution.

8. Method according to claim 1, further comprising, between, first, searching for and identifying the best integer ambiguity combination and, second, identifying the additional integer ambiguity combinations:

computing a variance of unit weight based on the error norm of the best integer ambiguity combination; and at least one of:

if the variance of unit weight is larger than 1, scaling a covariance matrix of the float solution by multiplying it by the variance of unit weight, and adjusting the error norm;

if the variance of unit weight is larger than 1 plus a margin, scaling the float solution's covariance matrix by multiplying it by the variance of unit weight, and adjusting the error norm, wherein the margin is a number comprised between 0.001 and 0.1, preferably 0.05;

if the variance of unit weight is larger than 1 plus a margin determined from a critical value of a statistical test, preferably a chi-squared test, scaling the float solution's covariance matrix by multiplying it by the variance of unit weight, and adjusting the error norm;

if the variance of unit weight is smaller than 1, scaling the float solution's covariance matrix by multiplying it by the variance of unit weight, and adjusting the error norm;

if the variance of unit weight is smaller than 1 minus a margin, scaling the float solution's covariance matrix by multiplying it by the variance of unit weight, and adjusting the error norm, wherein the margin is a number comprised between 0.001 and 0.1, preferably 0.05; and if the variance of unit weight is smaller than 1 minus a margin determined from the critical value of the statistical test, preferably a chi-squared test, scaling the float solution's covariance matrix by multiplying it by the variance of unit weight, and adjusting the error norm.

9. Method according to claim 1, wherein identifying, among the set of other integer ambiguity combinations determined based on the float solution, the additional integer ambiguity combinations comprises:

computing a search region bound based on the error norm of the best integer ambiguity combination and on the integrity risk; and determining the set of other integer ambiguity combinations based on the float solution and the computed search region bound.

10. Method according to claim 1, wherein identifying, among the set of other integer ambiguity combinations determined based on the float solution, the additional integer ambiguity combinations comprises:

determining the set of other integer ambiguity combinations by selecting a number, hereinafter referred to as "candidate number", of integer ambiguity combinations around the float solution, wherein, preferably, the candidate number is a number equal to or larger than $10^3$, and, more preferably, a number comprised between $10^5$ and $10^7$.

11. Method according to claim 1, further comprising, after identifying the additional integer ambiguity combinations:

determining that a number of identified additional integer ambiguity combinations is smaller than a threshold.

12. Method according to claim 1, wherein identifying the additional integer ambiguity combinations comprises:

identifying those integer ambiguity combinations having the smallest error norms that, together with the error norm of the best integer ambiguity combination, jointly satisfy the integrity risk under an assumption that the float solution has a leptokurtic error distribution, preferably an error distribution with a kurtosis larger than 3.05, and more preferably an error distribution with a kurtosis larger than 3.1.

13. Method according to claim 1, wherein identifying the additional integer ambiguity combinations comprises:

identifying those integer ambiguity combinations having the smallest error norms that, together with the error norm of the best integer ambiguity combination, jointly satisfy the integrity risk under an assumption that the float solution has an error distribution selected from among a group comprising a Student's t-distribution, a Pearson type IV distribution, a Laplace distribution, a logistic distribution, and an empirically derived distribution.

14. Method according to claim 1, wherein computing a measure of spread comprises at least one of:
   computing a difference between the maximum and minimum values among the positions in a coordinate frame corresponding to the best integer ambiguity combination and additional integer ambiguity combinations; and
   computing the difference between the maximum and minimum values among the values of the parameter, or differences between the maximum and minimum values among the values of the parameters, derivable from the best integer ambiguity combination and additional ambiguity combinations.

15. Method according to claim 1, wherein generating the at least one protection level based on the computed measure of spread comprises generating at least one of:
   a horizontal position protection level;
   a vertical position protection level;
   an along-track position protection level;
   a cross-track position protection level;
   a position protection level up relative to a track;
   a radial position protection level relative to a track;
   an ionospheric bias protection level;
   a tropospheric bias protection level;
   a satellite ephemeris bias protection level;
   a satellite clock bias protection level;
   a code multipath protection level; and
   a GLONASS frequency-dependent bias protection level.

16. Method of claim 15, wherein generating the at least one protection level based on the computed measure of spread comprises generating, for each of a plurality of satellites, at least:
   an ionospheric bias protection level;
   a tropospheric bias protection level;
   a satellite ephemeris bias protection level;
   a satellite clock bias protection level; and
   a code multipath protection level.

17. Computer program or set of computer programs comprising computer-readable instructions configured, when executed on a computer or set of computers, to cause the computer or set of computers to carry out the method claim 1.

18. Computer program product or storage mediums comprising a computer program or set of computer programs according to claim 17.

19. System comprising at least one of a navigation satellite system receiver, hereinafter abbreviated as "NSS receiver", and a processing entity capable of receiving data from the NSS receiver, the system being for estimating, or processing a prior estimation of, parameters derived from NSS signals useful to determine a position, and for generating at least one protection level for an application relying on NSS observations to produce an estimate of said parameters or a combination thereof, wherein a protection level is a statistical error bound ensuring that the estimate only exceeds the protection level with a probability, hereinafter referred to as an "integrity risk", and the system being configured for:
   computing a float solution using NSS signals observed by the NSS receiver;
   searching for, based on the float solution, and identifying an integer ambiguity combination that minimizes an error norm, the identified integer ambiguity combination being hereinafter referred to as "best integer ambiguity combination";
   identifying, among a set of other integer ambiguity combinations determined based on the float solution, those integer ambiguity combinations, hereinafter referred to as "additional integer ambiguity combinations", having the smallest error norms that, together with the error norm of the best integer ambiguity combination, jointly satisfy the integrity risk;
   computing a measure of spread of at least one of:
      (i) the best integer ambiguity combination and the additional integer ambiguity combinations, and
      (ii) values of a parameter or of parameters derivable from the best integer ambiguity combination and the additional ambiguity combinations; and
   generating the at least one protection level based on the computed measure of spread.

20. Vehicle comprising a system according to claim 19.

* * * * *